United States Patent
Villagran et al.

(10) Patent No.: US 11,794,175 B2
(45) Date of Patent: Oct. 24, 2023

(54) METAL-FREE PORPHYRIN-BASED ELECTROCATALYST

(71) Applicant: Board of Regents, The University of Texas System, Austin, TX (US)

(72) Inventors: Dino Villagran, El Paso, TX (US); Yulu Ge, El Paso, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 181 days.

(21) Appl. No.: 17/183,109

(22) Filed: Feb. 23, 2021

(65) Prior Publication Data

US 2022/0040681 A1    Feb. 10, 2022

Related U.S. Application Data

(60) Provisional application No. 62/980,926, filed on Feb. 24, 2020.

(51) Int. Cl.

| | |
|---|---|
| *B01J 31/06* | (2006.01) |
| *B01J 35/00* | (2006.01) |
| *C25B 1/02* | (2006.01) |
| *C25B 11/085* | (2021.01) |
| *C08G 69/32* | (2006.01) |
| *C25B 9/17* | (2021.01) |
| *C25B 1/04* | (2021.01) |

(52) U.S. Cl.
CPC ............ *B01J 31/06* (2013.01); *B01J 35/0033* (2013.01); *C08G 69/32* (2013.01); *C25B 1/02* (2013.01); *C25B 1/04* (2013.01); *C25B 9/17* (2021.01); *C25B 11/085* (2021.01)

(58) Field of Classification Search
CPC ........... C25B 1/02–1/044; C25B 11/085; B01J 31/06–31/10
See application file for complete search history.

(56) References Cited

FOREIGN PATENT DOCUMENTS

WO    WO-2017064279 A1 *  4/2017  .............. C25B 1/00

OTHER PUBLICATIONS

Patra et al. ("A Metal-Free Covalent Organic Polymer for Electrocatalytic Hydrogen Evolution", ACS Catal. 2017, 7, pp. 6120-6127 and the associated Supporting Information). (Year: 2017).*

Bhunia et al. ("Electrochemical Stimuli-Driven Facile Metal-Free Hydrogen Evolution from Pyrene-Porphyrin-Based Crystalline Covalent Organic Framework", ACS Appl. Mater. Interfaces 2017, 9, pp. 23843-23851). (Year: 2017).*

(Continued)

*Primary Examiner* — Alexander W Keeling
(74) *Attorney, Agent, or Firm* — Yee & Associates, P.C.

(57) ABSTRACT

A metal-free porphyrin based crystalline 2D organic polymer obtained from the condensation of terephthaloyl chloride and 5,10,15,20-tetrakis(4-aminophenyl) porphyrin, namely $H_2TAPP$), which is an effective bifunctional electrocatalyst for the oxygen evolution reaction (OER) in basic conditions and the hydrogen evolution reaction (HER) in neutral solutions. The electrochemical response of this material is explored under oxidation and reduction conditions in order to study its catalytic activity, charge transfer and stability.

21 Claims, 18 Drawing Sheets

(56) References Cited

OTHER PUBLICATIONS

Correction for Lewis and Nocera, Powering the planet: Chemical challenges in solar energy utilization. (2007). Proceedings of the National Academy of Sciences, 104(50), 20142. https://doi.org/10.1073/pnas.0710683104.

Kabir, E., Kumar, P., Kumar, S., Adelodun, A. A., & Kim, K. H. (2018). Solar energy: Potential and future prospects. Renewable and Sustainable Energy Reviews, 82, 894-900. https://doi.org/10.1016/j.rser.2017.09.094.

Winsche, W. E., Hoffman, K. C., & Salzano, F. J. (1973). Hydrogen: Its Future Role in the Nation's Energy Economy. Science, 180(4093), 1325-1332. https://doi.org/10.1126/science.180.4093.1325.

Reza Gholipour, M., Dinh, C. T., Béland, F., & Do, T. O. (2015). Nanocomposite heterojunctions as sunlight-driven photocatalysts for hydrogen production from water splitting. Nanoscale, 7(18), 8187-8208. https://doi.org/10.1039/c4nr07224c.

Rostrup-Nielsen, J. R. (2004). Fuels and Energy for the Future: The Role of Catalysis. Catalysis Reviews, 46(3-4), 247-270. https://doi.org/10.1081/cr-200036716.

Wang, F., Shifa, T. A., Zhan, X., Huang, Y., Liu, K., Cheng, Z., Jiang, C., & He, J. (2015). Recent advances in transition-metal dichalcogenide based nanomaterials for water splitting. Nanoscale, 7(47), 19764-19788. https://doi.org/10.1039/c5nr06718a.

Wang, Y., Wang, Q., Zhan, X., Wang, F., Safdar, M., & He, J. (2013). Visible light driven type II heterostructures and their enhanced photocatalysis properties: a review. Nanoscale, 5(18), 8326. https://doi.org/10.1039/c3nr01577g.

Park, M. S., & Kang, M. (2008). The preparation of the anatase and rutile forms of Ag-TiO2 and hydrogen production from methanol/water decomposition. Materials Letters, 62(2), 183-187. https://doi.org/10.1016/j.matlet.2007.04.105.

Greeley, J., Jaramillo, T. F., Bonde, J., Chorkendorff, I., & Nørskov, J. K. (2006). Computational high-throughput screening of electrocatalytic materials for hydrogen evolution. Nature Materials, 5(11), 909-913. https://doi.org/10.1038/nmat1752.

Chhowalla, M., Shin, H. S., Eda, G., Li, L. J., Loh, K. P., & Zhang, H. (2013). The chemistry of two-dimensional layered transition metal dichalcogenide nanosheets. Nature Chemistry, 5(4), 263-275. https://doi.org/10.1038/nchem.1589.

Yan, Y., Xia, B. Y., Zhao, B., & Wang, X. (2016). A review on noble-metal-free bifunctional heterogeneous catalysts for overall electrochemical water splitting. Journal of Materials Chemistry A, 4(45), 17587-17603. https://doi.org/10.1039/c6ta08075h.

Cobo, S., Heidkamp, J., Jacques, P. A., Fize, J., Fourmond, V., Guetaz, L., Jousselme, B., Ivanova, V., Dau, H., Palacin, S., Fontecave, M., & Artero, V. (2012). A Janus cobalt-based catalytic material for electro-splitting of water. Nature Materials, 11(9), 802-807. https://doi.org/10.1038/nmat3385.

Lee, Y., Suntivich, J., May, K. J., Perry, E. E., & Shao-Horn, Y. (2012). Synthesis and Activities of Rutile IrO2 and RuO2 Nanoparticles for Oxygen Evolution in Acid and Alkaline Solutions. The Journal of Physical Chemistry Letters, 3 (3), 399-404. https://doi.org/10.1021/jz2016507.

Reier, T., Oezaslan, M., & Strasser, P. (2012). Electrocatalytic Oxygen Evolution Reaction (OER) on Ru, Ir, and Pt Catalysts: A Comparative Study of Nanoparticles and Bulk Materials. ACS Catalysis, 2(8), 1765-1772. https://doi.org/10.1021/cs3003098.

Antolini, E. (2014). Iridium ss Catalyst and Cocatalyst for Oxygen Evolution/Reduction in Acidic Polymer Electrolyte Membrane Electrolyzers and Fuel Cells. ACS Catalysis, 4(5), 1426-1440. https://doi.org/10.1021/cs4011875.

Anderson, H. L. (1994). Conjugated Porphyrin Ladders. Inorganic Chemistry, 33(5), 972-981. https://doi.org/10.1021/c00083a022.

Hoffman, B. M., & Petering, D. H. (1970). Coboglobins: Oxygen-Carrying Cobalt-Reconstituted Hemoglobin and Myoglobin. Proceedings of the National Academy of Sciences, 67(2), 637-643. https://doi.org/10.1073/pnas.67.2.637.

Salemme, F. (1976). An hypothetical structure for an intermolecular electron transfer complex of cytochromes c and b5. Journal of Molecular Biology, 102(3), 563-568. https://doi.org/10.1016/0022-2836(76)90334-x.

Kuthan, H., & Ullrich, V. (1982). Oxidase and Oxygenase Function of the Microsomal Cytochrome P450 Monooxygenase System. European Journal of Biochemistry, 126(3), 583-588. https://doi.org/10.1111/i.1432-1033.1982.tb06820.x.

Trung Le Doan, Perrouault, L., Helene, C., Chassignol, M., & Nguyen Thanh Thuong. (1986). Targeted cleavage of polynucleotides by complementary oligonucleotides covalently linked to iron-porphyrins. Biochemistry, 25(22), 6736-6739. https://doi.org/10.1021/bi00370a002.

Krishnamurthy, P. C., Du, G., Fukuda, Y., Sun, D., Sampath, J., Mercer, K. E., Wang, J., Sosa-Pineda, B., Murti, K. G., & Schuetz, J. D. (2006). Identification of a mammalian mitochondrial porphyrin transporter. Nature, 443(7111), 586-589. https://doi.org/10.1038/nature05125.

Abe, T., Taguchi, F., Imaya, H., Zhao, F., Zhang, J., & Kaneko, M. (1998). Highly active electrocatalysis by cobalt tetraphenylporphyrin incorporated in a Nafion membrane for proton reduction. Polymers for Advanced Technologies, 9 (9), 559-562.

Bhugun, I., Lexa, D., & Savéant, J. M. (1996). Homogeneous Catalysis of Electrochemical Hydrogen Evolution by Iron (0) Porphyrins. Journal of the American Chemical Society, 118(16), 3982-3983. https://doi.org/10.1021/ja954326x.

Grass, V., Lexa, D., & Savéant, J. M. (1997). Electrochemical Generation of Rhodium Porphyrin Hydrides. Catalysis of Hydrogen Evolution. Journal of the American Chemical Society, 119(32), 7526-7532.

Lee, C. H., Dogutan, D. K., & Nocera, D. G. (2011). Hydrogen Generation by Hangman Metalloporphyrins. Journal of the American Chemical Society, 133(23), 8775-8777. https://doi.org/10.1021/ja202136y.

Bediako, D. K., Solis, B. H., Dogutan, D. K., Roubelakis, M. M., Maher, A. G., Lee, C. H., Chambers, M. B., Hammes-Schiffer, S., & Nocera, D. G. (2014). Role of pendant proton relays and proton-coupled electron transfer on the hydrogen evolution reaction by nickel hangman porphyrins. Proceedings of the National Academy of Sciences, 111 (42), 15001-15006. https://doi.org/10.1073/pnas.1414908111.

Zhang, Y. Q., & Liao, R. Z. (2017). Reaction mechanism of hydrogen evolution catalysed by Co and Fe complexes containing a tetra-dentate phosphine ligand—a DFT study. Physical Chemistry Chemical Physics, 19(48), 32589-32596. https://doi.org/10.1039/c7cp06222b.

Zhang, W., Lai, W., & Cao, R. (2016). Energy-Related Small Molecule Activation Reactions: Oxygen Reduction and Hydrogen and Oxygen Evolution Reactions Catalyzed by Porphyrin- and Corrole-Based Systems. Chemical Reviews, 117(4), 3717-3797. https://doi.org/10.1021/acs.chemrev.6b00299.

Wurster, B., Grumelli, D., Hötger, D., Gutzler, R., & Kern, K. (2016). Driving the Oxygen Evolution Reaction by Nonlinear Cooperativity in Bimetallic Coordination Catalysts. Journal of the American Chemical Society, 138(11), 3623-3626. https://doi.org/10.1021/jacs.5b10484.

Naruta, Y., Sasayama, M. A., & Sasaki, T. (1994). Oxygen Evolution by Oxidation of Water with Manganese Porphyrin Dimers. Angewandte Chemie International Edition in English, 33(18), 1839-1841. https://doi.org/10.1002/anie.199418391.

Cui, S., Qian, M., Liu, X., Sun, Z., & Du, P. (2016). A Copper Porphyrin-Based Conjugated Mesoporous Polymer-Derived Bifunctional Electrocatalyst for Hydrogen and Oxygen Evolution. ChemSusChem, 9(17), 2365-2373. https://doi.org/10.1002/cssc.201600452.

Holm, R. H. (1987). Metal-Centered Oxygen Atom Transfer Reactions. Chem. Rev., 87, 1401-1449.

Cheng, M. J., Head-Gordon, M., & Bell, A. T. (2014). How to Chemically Tailor Metal-Porphyrin-Like Active Sites on Carbon Nanotubes and Graphene for Minimal Overpotential in the Electrochemical Oxygen Evolution and Oxygen Reduction Reactions. The Journal of Physical Chemistry C, 118(51), 29482-29491. https://doi.org/10.1021/jp507638v.

(56) References Cited

OTHER PUBLICATIONS

Patra, B. C., Khilari, S., Manna, R. N., Mondal, S., Pradhan, D., Pradhan, A., & Bhaumik, A. (2017). A Metal-Free Covalent Organic Polymer for Electrocatalytic Hydrogen Evolution. ACS Catalysis, 7(9), 6120-6127. https://doi.org/10.1021/acscatal.7b01067.

Swierk, J. R., Méndez-Hernández, D. D., McCool, N. S., Liddell, P., Terazono, Y., Pahk, I., Tomlin, J. J., Oster, N. V., Moore, T. A., Moore, A. L., Gust, D., & Mallouk, T. E. (2015). Metal-free organic sensitizers for use in water-splitting dye-sensitized photoelectrochemical cells. Proceedings of the National Academy of Sciences, 112(6), 1681-1686. https://doi.org/10.1073/pnas.1414901112.

Medforth, C. J., Senge, M. O., Smith, K. M., Sparks, L. D., & Shelnutt, J. A. (1992). Nonplanar distortion modes for highly substituted porphyrins. Journal of the American Chemical Society, 114(25), 9859-9869. https://doi.org/10.1021/a00051a019.

Ito, A., Konishi, K., & Aida, T. (1996). Free bases of chiral N-substituted porphyrins as catalysts for asymmetric reaction. Tetrahedron Letters, 37(15), 2585-2588. https://doi.org/10.1016/0040-4039(96)00376-0.

Wu, Y., Rodríguez-López, N., & Villagrán, D. (2018). Hydrogen gas generation using a metal-free fluorinated porphyrin. Chemical Science, 9(20), 4689-4695. https://doi.org/10.1039/c8sc00093j.

Penn, L., & Larsen, F. (1979). Physicochemical properties of kevlar 49 fiber. Journal of Applied Polymer Science, 24 (2), 599. https://doi.org/10.1002/app.1979.070240225.

Feng, D. M., Zhu, Y. P., Chen, P., & Ma, T. Y. (2017). Recent Advances in Transition-Metal-Mediated Electrocatalytic CO2 Reduction: From Homogeneous to Heterogeneous Systems. Catalysts, 7(12), 373. https://doi.org/10.3390/catal7120373.

Tanner, D., Fitzgerald, J. A., & Phillips, B. R. (1989). The Kevlar Story—An Advanced Materials Case Study. Angewandte Chemie, 101(5), 665-670. https://doi.org/10.1002/ange.19891010539.

Li, L. S., Allard, L. F., & Bigelow, W. C. (1983). On the morphology of aromatic polyamide fibers (Kevlar, Kevlar-49, and PRD-49). Journal of Macromolecular Science, Part B, 22(2), 269-290. https://doi.org/10.1080/00222348308215504.

Karimipour, G., Kowkabi, S., & Naghiha, A. (2015). New aminoporphyrins bearing urea derivative substituents: synthesis, characterization, antibacterial and antifungal activity. Brazilian Archives of Biology and Technology, 58(3), 431-442. https://doi.org/10.1590/s1516-8913201500024.

Yan, H., Li, J., Tian, W., He, L., Tuo, X., & Qiu, T. (2016). A new approach to the preparation of poly(p-phenylene terephthalamide) nanofibers. RSC Advances, 6(32), 26599-26605. https://doi.org/10.1039/c6ra01602b.

Bala Murali Krishna, M., Venkatramaiah, N., Venkatesan, R., & Narayana Rao, D. (2012). Synthesis and structural, spectroscopic and nonlinear optical measurements of graphene oxide and its composites with metal and metal free porphyrins. Journal of Materials Chemistry, 22(7), 3059. https://doi.org/10.1039/c1jm14822b.

Yeager, M. P., Hoffman, C. M., Xia, Z., & Trexler, M. M. (2016). Method for the synthesis of para-aramid nanofibers. Journal of Applied Polymer Science, 133(42). https://doi.org/10.1002/app.44082.

Bhunia, S., Das, S. K., Jana, R., Peter, S. C., Bhattacharya, S., Addicoat, M., Bhaumik, A., & Pradhan, A. (2017). Electrochemical Stimuli-Driven Facile Metal-Free Hydrogen Evolution from Pyrene-Porphyrin-Based Crystalline Covalent Organic Framework. ACS Applied Materials & Interfaces, 9(28), 23843-23851. https://doi.org/10.1021/acsami.7b06968.

Sun, J., Yin, H., Liu, P., Wang, Y., Yao, X., Tang, Z., & Zhao, H. (2016). Molecular engineering of Ni-/Co-porphyrin multilayers on reduced graphene oxide sheets as bifunctional catalysts for oxygen evolution and oxygen reduction reactions. Chemical Science, 7(9), 5640-5646. https://doi.org/10.1039/c6sc02083f.

Xiang, Q., Li, F., Chen, W., Ma, Y., Wu, Y., Gu, X., Qin, Y., Tao, P., Song, C., Shang, W., Zhu, H., Deng, T., & Wu, J. (2018). In Situ Vertical Growth of Fe—Ni Layered Double-Hydroxide Arrays on Fe—Ni Alloy Foil: Interfacial Layer Enhanced Electrocatalyst with Small Overpotential for Oxygen Evolution Reaction. ACS Energy Letters, 3(10), 2357-2365. https://doi.org/10.1021/acsenergylett.8b01466.

Zhu, Y., Zhou, W., Zhong, Y., Bu, Y., Chen, X., Zhong, Q., Liu, M., & Shao, Z. (2016). A Perovskite Nanorod as Bifunctional Electrocatalyst for Overall Water Splitting. Advanced Energy Materials, 7(8), 1602122. https://doi.org/10.1002/aenm.201602122.

Fang, Y. H., & Liu, Z. P. (2014). Tafel Kinetics of Electrocatalytic Reactions: From Experiment to First-Principles. ACS Catalysis, 4(12), 4364-4376. https://doi.org/10.1021/cs501312v.

McCrory, C. C. L., Jung, S., Peters, J. C., & Jaramillo, T. F. (2013). Benchmarking Heterogeneous Electrocatalysts for the Oxygen Evolution Reaction. Journal of the American Chemical Society, 135(45), 16977-16987. https://doi.org/10.1021/ja407115p.

Shi, H., Liang, H., Ming, F., & Wang, Z. (2016). Efficient Overall Water-Splitting Electrocatalysis Using Lepidocrocite VOOH Hollow Nanospheres. Angewandte Chemie International Edition, 56(2), 573-577. https://doi.org/10.1002/anie.201610211.

Zhang, J., Zhao, L., Liu, A., Li, X., Wu, H., & Lu, C. (2015). Three-dimensional MoS2/rGO hydrogel with extremely high double-layer capacitance as active catalyst for hydrogen evolution reaction. Electrochimica Acta, 182, 652-658. https://doi.org/10.1016/j.electacta.2015.09.147.

\* cited by examiner

METAL-FREE PORPHYRIN-BASED ELECTROCATALYST

CROSS REFERENCE TO RELATED APPLICATION

This application is a utility conversion of, and claims priority to, U.S. Ser. No. 62/980,926, filed Feb. 24, 2020, the contents of which are incorporated herein by reference in their entirety for all purposes.

BACKGROUND

Global energy consumption increased drastically within the past 20 years and it is expected to continue to grow over the next several decades. The rapid depletion of non-renewable resources and their related combustion issues require the development of alternative energy sources and technologies with zero carbon footprint.

Hydrogen is an ideal energy carrier due to its high energy density compared with conventional fossil fuels and because water is its only combustion by-product. Currently, the production of hydrogen gas in industry is dependent on methane steam reforming which renders its production unsustainable and carbon positive.

Theoretically, water can be an abundant source of hydrogen if hydrogen and oxygen gases can be produced through electrolysis. Water splitting requires a four-electron redox process in addition to concomitant proton transfer, and high thermodynamic demands (1.23 eV at pH 7.0). Current research efforts are focused on using renewable energy sources such as sunlight to induce water splitting directly or indirectly with minimal environmental effects.

Electrochemical water splitting is effective and promising, and the development of water splitting electrocatalysts that have low-cost, long-lifetime and high-performance is an important area of research for the economic generation of hydrogen and oxygen gas. However, commercial electrolyzers require robust and efficient catalysts to accomplish Hydrogen Evolution Reaction (HER) and Oxygen Evolution Reaction (OER). Current electrocatalysts that meet these demands are based on scarce and expensive transition metals (i.e. Pt elements for HER and $RuO_2/IrO_2$ for OER), thus, the use of single earth-abundant materials as bifunctional catalysts for both HER and OER is desired for sustainable and economic feasibility.

SUMMARY

According to an embodiment of the present invention, a metal-free porphyrin-based two-dimensional crystalline covalent organic polymer obtained from the condensation of terephthaloyl chloride and 5,10,15,20-tetrakis(4-aminophenyl) porphyrin which is stabilized by an extensive hydrogen bonding network. This material, named Porphvlar, exhibits bifunctional electrocatalytic performance towards water splitting with onset overpotentials, η, of approximately 43 mV and approximately 150 mV for HER and OER, respectively. Characterized by electrochemical impedance spectroscopy (EIS) and chronoamperometry, the as-synthesized material also shows enhanced conductivity and stability compared to its molecular counterpart. The molecular porphyrin units provide the electrocatalytic active sites, and the polymer network magnifies the activity through its conjugated structure and hydrogen bonding. The high performance of this metal-free material towards water splitting provides a sustainable alternative to the use of scarce and expensive metal electrocatalysts in energy conversion for industrial applications.

We have developed an efficient and stable bifunctional metal-free Porphvlar polymer electrocatalyst for HER and OER constructed by the condensation of (4-aminophenyl) porphyrin ($H_2TAPP$) into PPTA networks. The HER and OER catalytic performances are higher than those of other metal-free materials and comparable or better than several traditional metallic electrocatalysts. The catalytic ability of Porphvlar occurs from the molecular porphyrin nodes. This activity is further enhanced by the 2D network arrangement of the hydrogen-bonded PPTA networks. This material provides a novel approach into the design of metal-free electrocatalysts, and takes advantage of the structural interactions within a 2D network to yield high electrochemical performance, conductivity and durability.

DETAILED DESCRIPTION

Figure 1A:
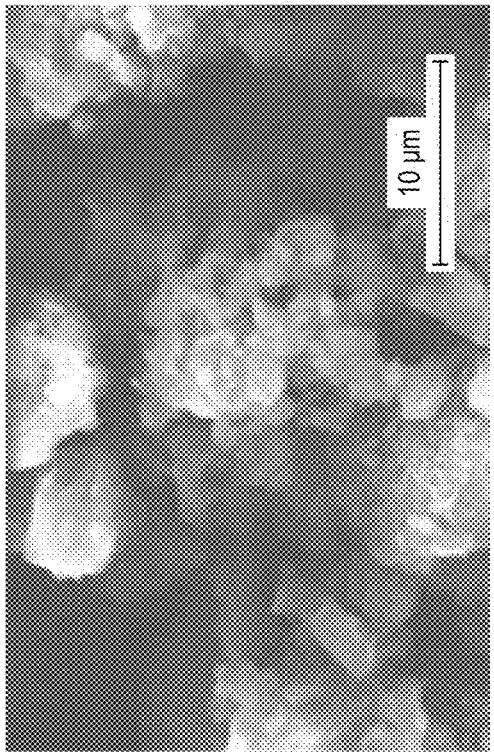
FIGS. 1A-1D are SEM micrographs of the as-synthesized Porphvlar polymer at different scales: (a) 10.00 μm; (b) 5.00 μm; (c) 3.00 μm; and (d) 1.00 μm.
Figure 1B:
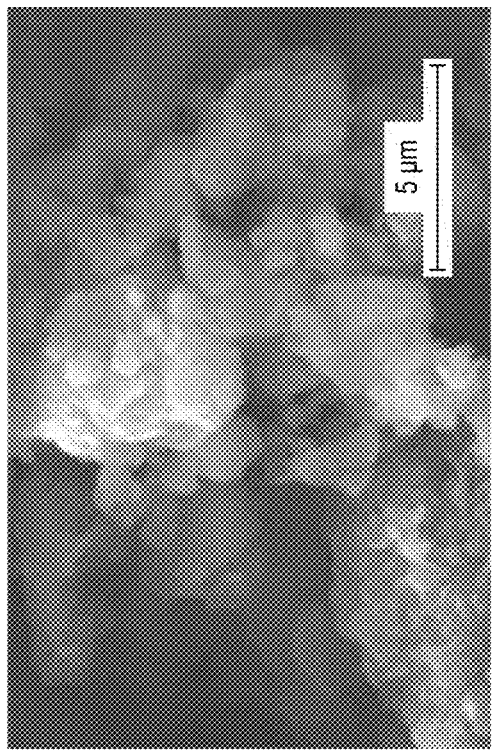
Figure 1C:
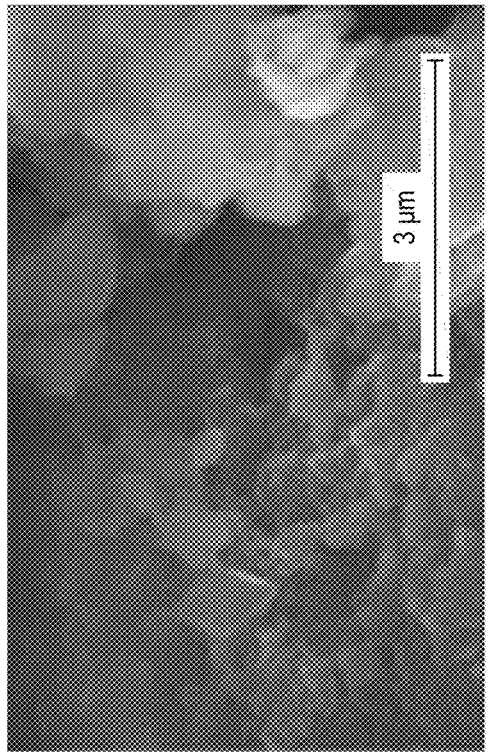
Figure 1D:
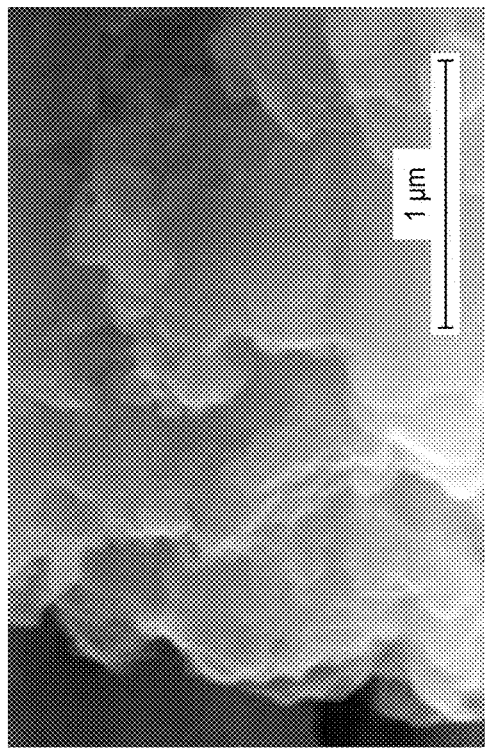
Figure 2A:
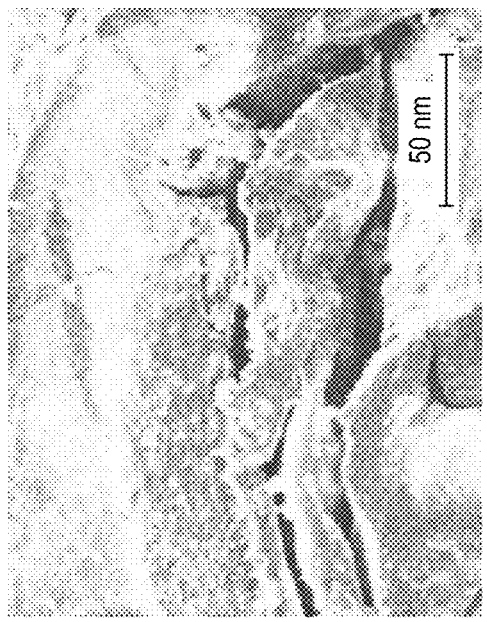
FIGS. 2A-2D are Energy-dispersive X-ray spectroscopy (EDX) of Porphvlar sample.
Figure 2B:
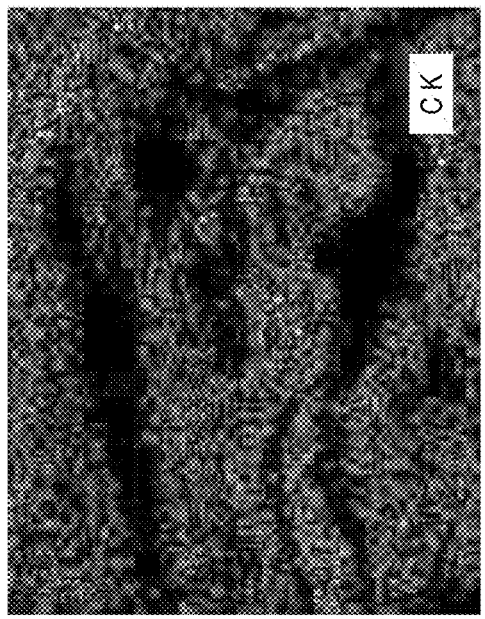
Figure 2C:
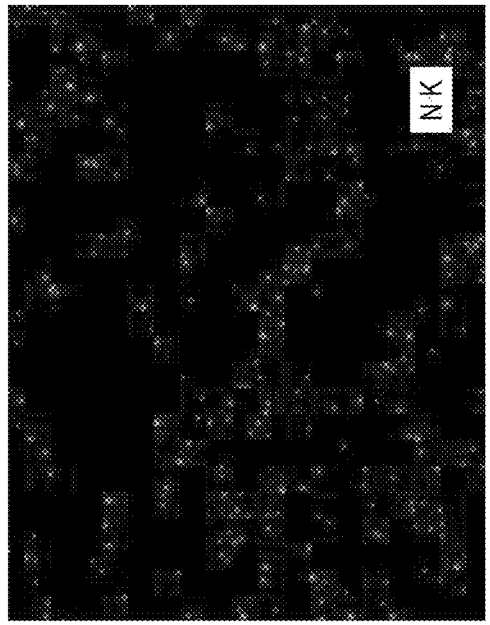
Figure 2D:
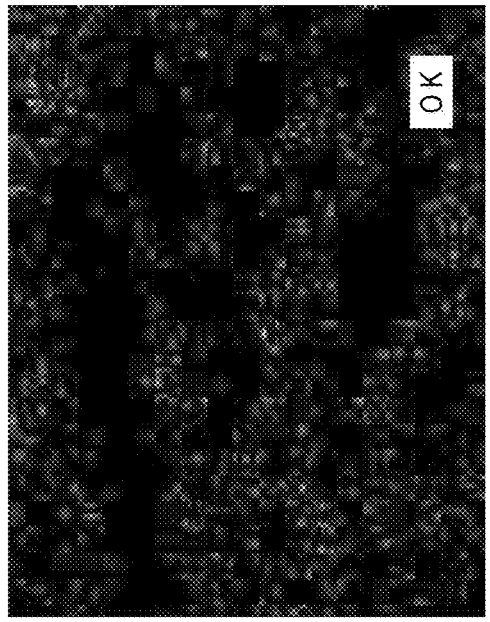

Porphyrins are organic macrocycles with four pyrrole subunits interconnected through methine bridges that have conjugated aromatic rings and characteristic intense colors. In nature, porphyrin complexes play an important role for the binding, transport and storage of oxygen (hemoglobin and myoglobin), electron transfer (cytochrome b and c), oxygen activation and utilization (cytochrome oxidase and cytochrome P450) and other biological processes. Porphyrin-based catalysts for water splitting have been exclusively focused on metallated complexes. The generation of high-valent metal-oxo intermediates is the key step to form molecular oxygen, where the porphyrin scaffold serves only as a molecular frame to facilitate the multi-electron transfer process, and a metal center is responsible for the catalytic activity. Similar mechanisms are also invoked in HER which have metal-hydride intermediates as proton transfer carriers.

In fact, the catalytic activity of porphyrin complexes towards hydrogen generation does not necessarily require a metal center. The N—H groups and N-lone pairs in the core of free base porphyrins can also act as active sites for hydrogen generation under acidic conditions. Electronic tuning at the meso-position by electron donating or withdrawing groups can yield porphyrin complexes with varied basicity at the nitrogen core that lead to distinct redox reactivity. Our previous work shows that a metal-free porphyrin with perfluorinated meso-substituted groups is able to electrocatalyze hydrogen generation in acidic conditions with a potential of −1.31V (vs. Fc/Fc') and 90% Faradaic efficiency. This activity arises from the electron-withdrawing fluorine groups that facilitate the generation of diprotonated intermediates under the electrocatalytic environment. However, molecular level electrocatalysts suffer from issues such as stability, low current densities, high cost and non-recyclability for industrial utilization. Therefore, the development of low-cost heterogeneous electrocatalysts that possess high reactivity and stability towards water splitting could be a promising strategy for hydrogen and oxygen production.

Poly(p-phenylene terephthalamide) (PPTA) are a type of ultra-strong synthetic macroscale fibers with high tensile strength-to-weight ratio. The amide linkages in the structure are able to form hydrogen bonds between the polymer chains which act like "hydrogen bond locks". Furthermore, aromatic stacking interactions between adjacent strands provide additional strength that make it a material used in bullet-proof body armors. Incorporating units of free-base porphyrins into PPTA extended networks can result in two-dimensional (2D) porphyrin-based polymers with ordered columnar n-arrays. Porphyrin moieties can enhance aromatic stacking interactions, and add charge transport properties used in electrocatalytic applications. However, the use of metal-free porphyrin-based polymer as bifunctional electrocatalysts directly for both HER and OER is still underexplored.

In this work, we present the synthesis of a metal-free porphyrin based crystalline 2D organic polymer obtained from the condensation of terephthaloyl chloride and 5,10,15,20-tetrakis(4-aminophenyl porphyrin, namely H$_2$TAPP), which is an effective bifunctional electrocatalyst for the oxygen evolution reaction (OER) in basic conditions and the hydrogen evolution reaction (HER) in neutral solutions. The electrochemical response of this material is explored under oxidation and reduction conditions in order to study its catalytic activity, charge transfer and stability.

EXAMPLES

Materials

4-Nitrobenzaldehyde (99%), tin (II) chloride dihydride (SnCl$_2$·2H$_2$O, 98+%) were purchased from Acros Organics, terephthaloyl chloride (99%) and Nafion solution (5% w/w in H$_2$O and 1-propanol) were obtained in Alfa Aesar, pyrrole (98%), pyridine (99%), hydrochloride acid (HCl), potassium hydroxide (KOH), sulfuric acid (H$_2$SO$_4$) and PBS buffer were purchased from Fisher Scientific and used without further purification.

Instrumentation

Scanning electron microscopy (SEM) studies were performed on SEM Hitachi S-4800 instrument. Energy-dispersive X-ray spectroscopy (EDX) studies were performed on SEM Hitachi S-4800 instrument. Powder x-ray diffraction pXRD patterns were obtained on a Panalytical Empyrean X-ray Diffractometer. Infrared spectroscopy (IR) through Agilent Cary 630 FTIR Spectrometer. UV-vis spectrum data from ALS SEC2020 Spectrometer system. All electrochemical measurements were performed in a three-compartment electrochemical glass cell using a CHI760D potentiostat.

Sample Preparation

Synthesis of (H$_2$TAPP)

A solution of 4-nitrobenzaldehyde (3.0 g, 20 mmol) and acetic anhydride (3.6 mL, 34.8 mmol) in 100 mL propionic acid was heated to 120° C. The mixture of freshly distilled pyrrole (1.4 mL, 20 mmol) was added slowly under N$_2$ and the reaction was stirred at 140° C. for 2 h. Upon cooling, the mixture was refrigerated overnight, and then the resulting precipitate was collected by filtration and washed with MeOH and DI water. The obtained dark solid was dissolved in pyridine (20 mL) and refluxed for 1 h. After cooling down, the system was refrigerated overnight. The nitrated product 5,10,15,20-Tetrakis(4-nitrophenyl) porphyrin, H$_2$TNPP, was obtained by filtering. It was then washed with a 1:1 mixture of MeOH/acetone and dried under the vacuum yielding 3.7938 g (4.76 mmol) of a purple solid. Without any further purification H$_2$TNPP was dissolved in 480 mL of concentrated hydrochloric acid. A solution of 27 g (130 mmol) SnCl$_2$·2H$_2$O in 120 mL concentrated hydrochloric acid was added to the porphyrin solution within 20 mins and was vigorously stirred for 3 h. Then the reaction mixture was placed in a hot water bath for 1.5 h. After this, the reaction was cooled down to room temperature, then put in an ice bath. The greenish solid obtained was dispersed in 1000 mL DI water. Concentrated ammonia was added dropwise in order to neutralize the excess acid until the pH of the solution was approximately 7. The purplish solid was washed twice with water, dried under vacuum at room temperature, and then Soxhlet-extracted with acetone for 24 h. The solvent was removed under reduced pressure to give isolated H$_2$TAPP as a purple crystal with a yield of 34.3% (1.1105 g). UV-vis ($\lambda_{max}$ nm in THF at 298 K), [log ε(103 M-1cm-1]: 429, 521, 570, 663. 1H NMR (600 MHz, CDCl3, 25° C.): δ -2.72 (s, 2H, pyrrole NH), 4.03 (s, 8H, amine NH$_2$), 8.90 (s, 8H, β-pyrrole), 7.98 (d, 8H, J=8.1 Hz, 2,6-(4-aminophenyl)), 7.07 (d, 8H, J=8.1 Hz, 3,5-(4-aminophenyl)).

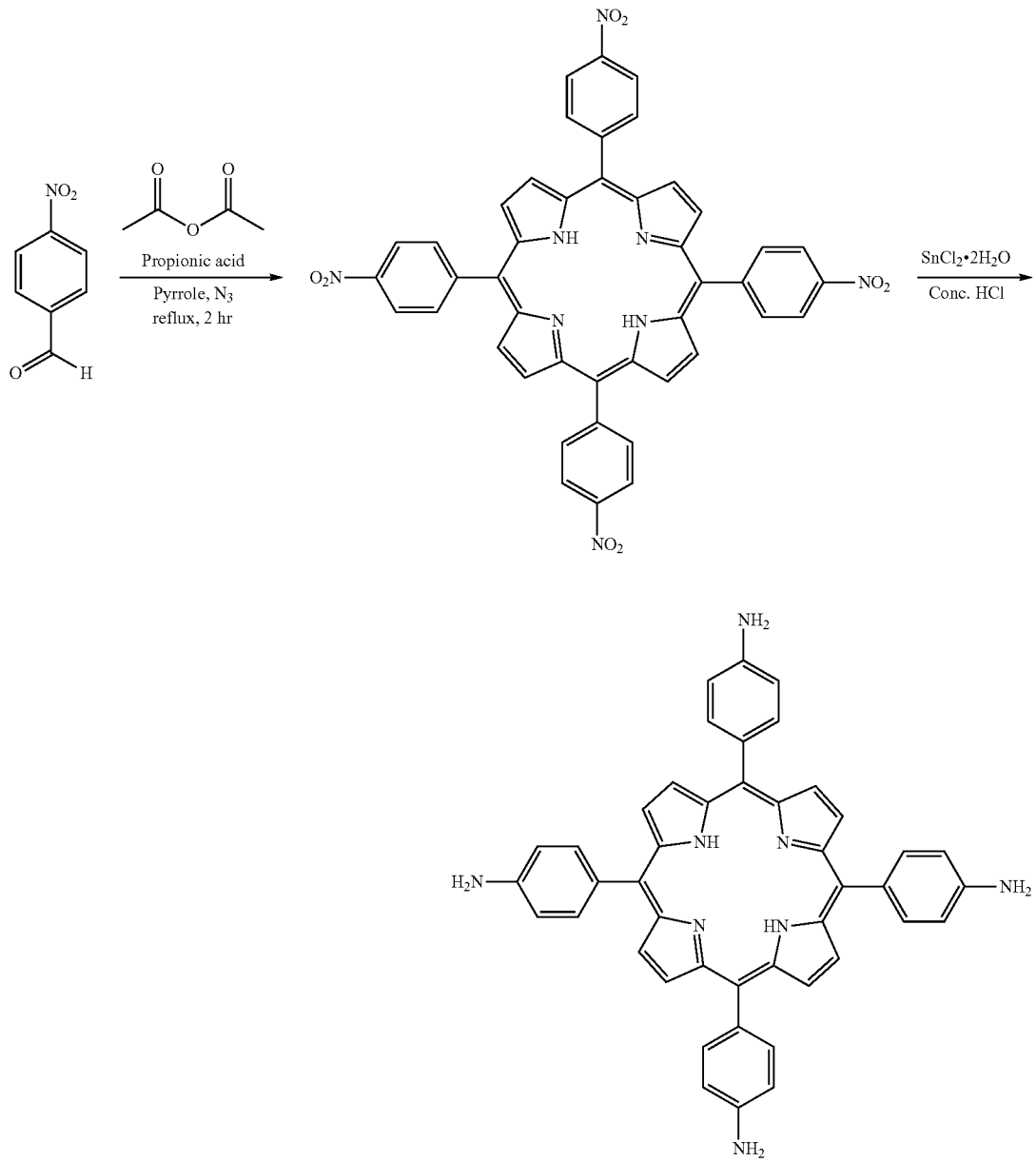

Synthesis of Porphvlar

Porphvlar was synthesized through the polymerization of H$_2$TAPP and terephthaloyl chloride, as shown in Scheme 2. Initially, N-methyl-2-pyrrolidone (NMP) 0.5 mL was added into 100 mL round bottom flask, then bubbled N$_2$ to remove oxygen. When the temperature of the solvent reached 78° C., finely ground dry CaCl$_2$) was added and dissolved. H$_2$TAPP (72 mg, 0.106 mmol) and pyridine (0.025 mL) was added to the system with stirring. When H$_2$TAPP was completely dissolved, the temperature was lowered with an ice-bath. The polymerization was started by adding terephthaloyl chloride (88 mg, 0.425 mmol). After 1 h, DI water was added into the reaction and the resulting mixture was quickly filtered with a Buchner funnel and hydrophilic disks. The residue was washed with ethanol and water. The material was ground and kept immersed in ethanol overnight. The suspension was filtered again and dried under vacuum to yield a greenish powder (yield: 48.7 mg, 37.7%). UV-vis ($\lambda_{max}$ nm in THF at 298° K), [log ε(10$^3$ M-1cm-1]: 425, 518, 556, 654. FT-IR (solid): 3000, 2960, 2378, 2126, 1681, 1587 cm$^{-1}$.

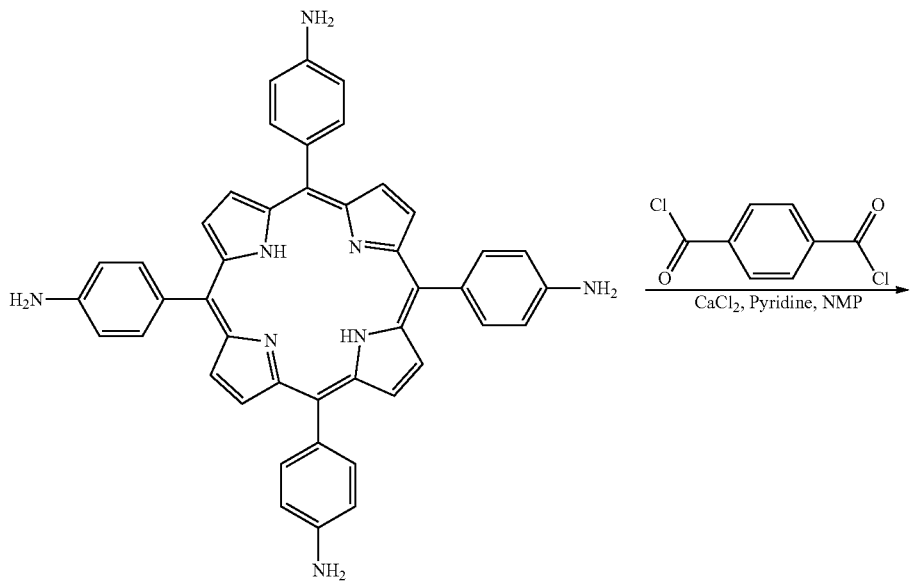

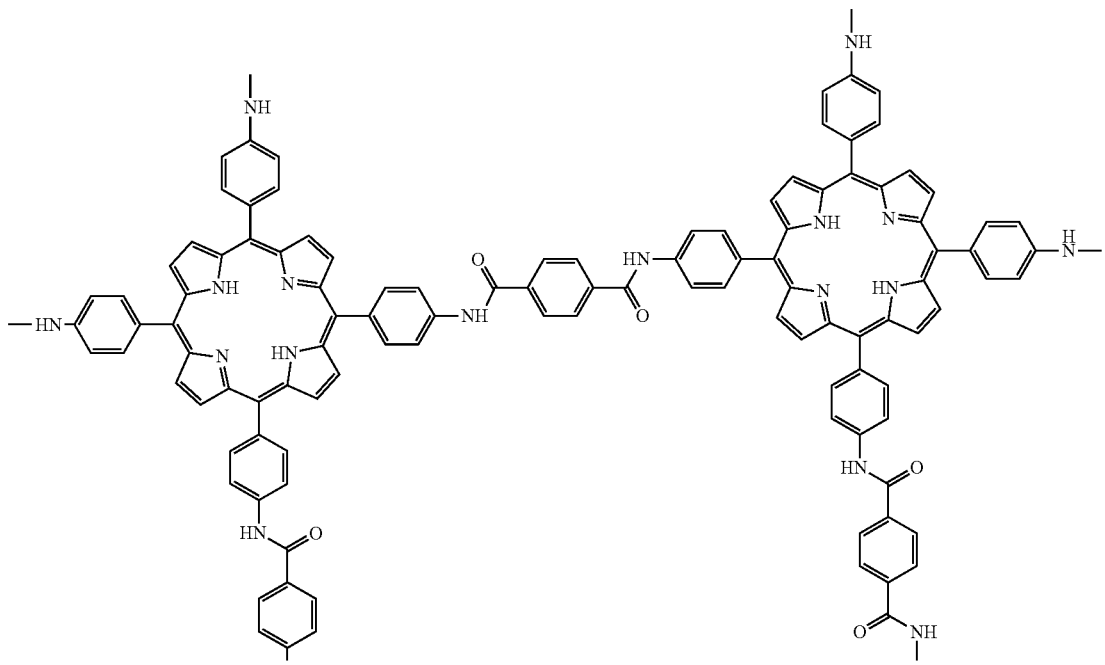

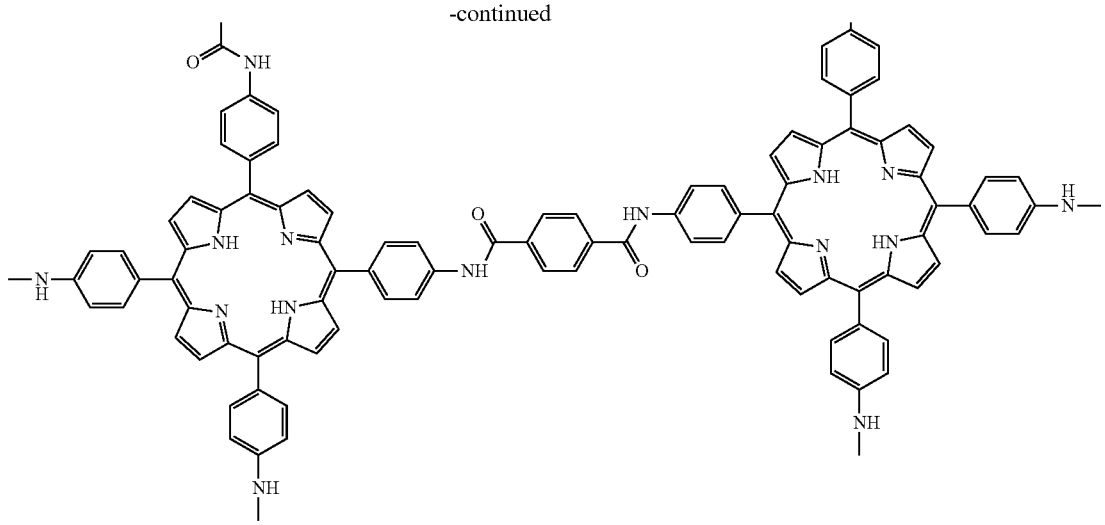

Sample Characterization

FIGS. 1A-1D are SEM micrographs of the as-synthesized Porphvlar polymer at different scales. Scanning electron microscopy (SEM) images were obtained to evaluate the structure of the synthesized Porphvlar polymer in different magnifications. FIGS. 1A-1D show that the Porphvlar powder exhibits a flake-like morphology. The flakes are stacked in layers of a couple nanometers in thickness. This is in contrast to the rod-like topology of PPTA threads.

FIGS. 2A-2D are energy-dispersive X-ray spectroscopy (EDX) of Porphyrin Kevlar sample. Energy-dispersive x-ray spectroscopy (EDX) FIGS. 2A-2D show that only C, N and O elements exist throughout the Porphvlar structure without the presence of any metal atoms that could have possibly been incorporated through the synthetic processes.

Figure 3:
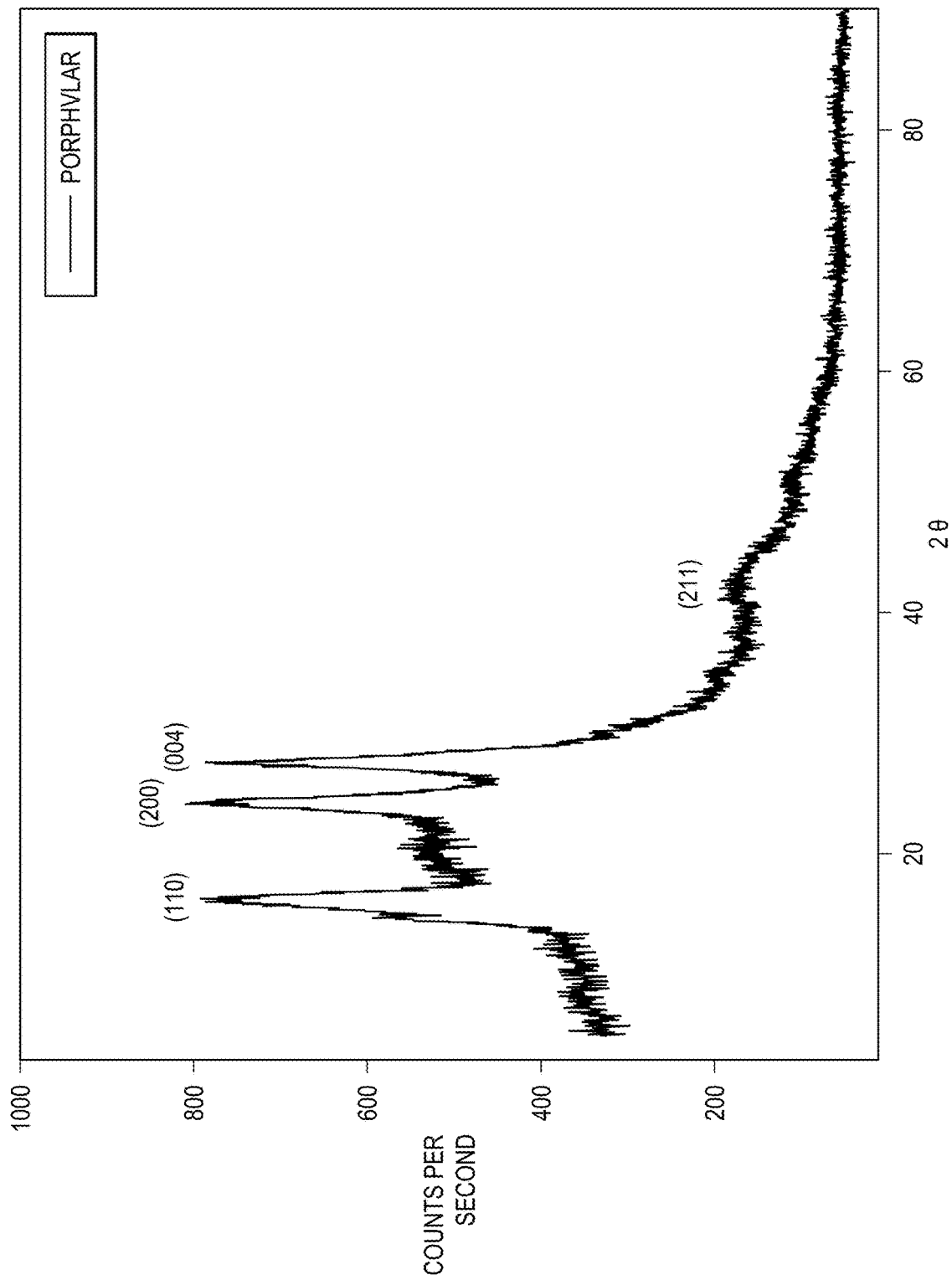
FIG. 3 is p-XRD pattern of the as-synthesized Porphvlar.

FIG. 3 is powder x-ray diffraction (p-XRD) pattern of the as-synthesized Porphvlar. The p-XRD pattern in FIG. 3 shows that the sample is microcrystalline. The p-XRD pattern of Porphvlar closely resembles the crystalline pattern of commercial PPTA. The diffraction peaks observed at 2θ=24.1°, 27.5°, 28.4° and 42.4° correspond to the (1 1 0), (2 0 0), (0 0 4) and (2 1 1) planes, respectively, which are also present in PPTA fibers. The broad peak centered at around 2θ=20° is attributed to π-π stacking between the 2D layers, where the porphyrin units in form an AA type eclipsed stacking.

Figure 4A:
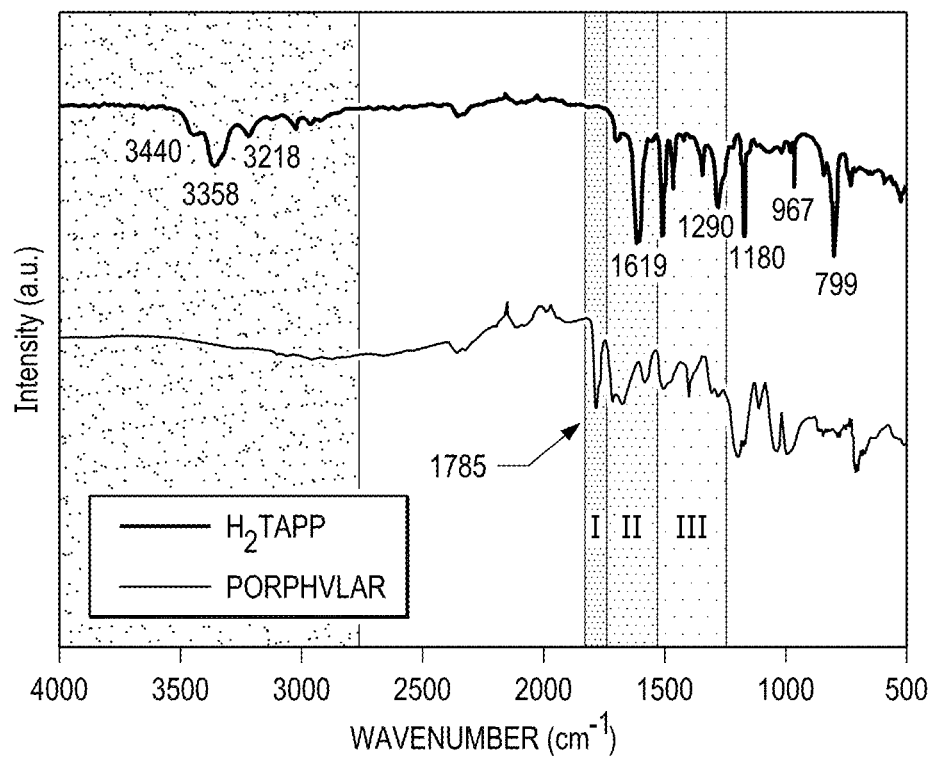
FIGS. 4A-4B are (a) FT-IR spectroscopy of Porphvlar and molecular porphyrin ($H_2TAPP$) and (b) Comparison UV-vis spectra of Porphvlar and $H_2TAPP$.

FIG. 4A illustrates FT-IR spectroscopy of Porphvlar and molecular porphyrin ($H_2$TAPP). The FT-IR and UV-vis spectra of Porhpvlar were compared to those obtained from the molecular porphyrin unit, $H_2$TAPP.

FIG. 4A shows the FT-IR spectra for both the porphyrin unit (top) and Porphvlar (bottom) materials. Porphvlar exhibits a band at 1785 cm$^{-1}$ assigned to the amide I (carbonyl stretch, yellow region), the amide II band (N—H bend) appears around 1500-1700 cm$^{-1}$ (green region) and the amide III band is observed in the blue region. These bands indicate the formation of the amide group in the Porphvlar structure and are missing in $H_2$TAPP. In addition, the γ-(N—H) pyrrole out-of-plane stretch is observed at 799 cm$^{-1}$ in $H_2$TAPP and shifts to ~1000 cm$^{-1}$ in Porphvlar. Two primary amine ν-(N—H) stretching bands at 3440 and 3356 cm$^{-1}$ and one sp$^2$ ν-(C—H) stretching peak (3218 cm$^1$) are visible in $H_2$TAPP, and those appear as a broad band around 3000 cm$^{-1}$ in Porphvlar (pink region) due to hydrogen bonding between the polymer layers.

Figure 4B:
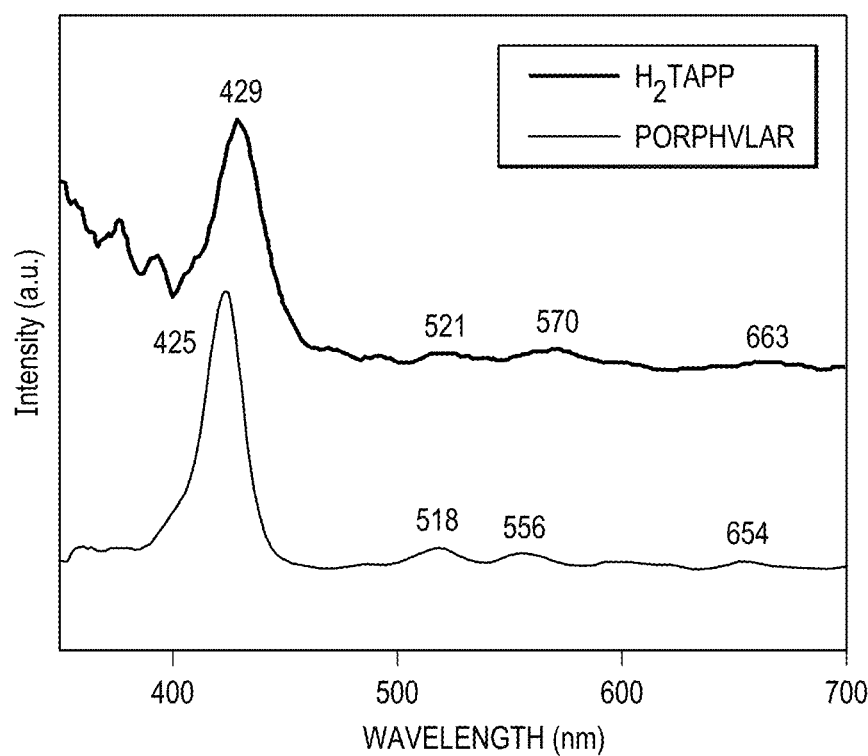

FIG. 4B shows the UV-vis spectra of $H_2$TAPP and Porphvlar. $H_2$TAPP has the indicative spectrum of a free-base porphyrin with a Soret band at 429 nm along with its corresponding Q-bands between 521 to 663 nm. Porphvlar shares a similar spectrum where the Soret and Q bands are blue-shifted by about 4 nm. This indicates that the porphyrin unit is incorporated into the Porphvlar network.

Electrochemical Methods

A graphite rod was used as the counter electrode, and a saturated calomel electrode (SCE) was employed as the reference electrode. Aqueous 1.0 M KOH 1.0 M PBS buffer and 0.5 M $H_2SO_4$ were used as electrolyte and purged with nitrogen gas to remove the dissolved oxygen prior to each measurement. To minimize the double layer charging, a low scan rate of 5 mV/s was used to perform linear sweep voltammetry (LSV). Electrochemical impedance spectroscopy (EIS) was obtained at an overpotential, η, of 250 mV from 100 KHz to 0.1 Hz with an AC voltage of 5 mV. Bulk electrolysis and chronoamperometric measurements were tested at the voltage with current density at around 10 mA/cm$^2$ and at around 5 mA/cm$^2$ for 16 hours in ambient atmosphere.

All potentials referenced to saturated calomel electrode (SCE) were calibrated with respect to reversible hydrogen electrode (RHE) using the equation:

$$E = E_0 + 0.245 \pm 0.059 \times pH$$

All the experimental potential data were calibrated at a pH of 14 for OER. All the current densities obtained were normalized by dividing the obtained current response with the geometric area of the working electrode (0.25 cm$^2$).

Preparation of Porphvlar Modified Carbon Paper Electrode

Carbon paper stripe substrates were coated with the Porphvlar catalyst and this was utilized as working electrode for electrochemical studies. A catalyst ink was prepared by mixing catalyst powder (5.0 mg), carbon black (0.25 mg), 2-isopropanol (1.00 mL) and a Nafion solution (4.08 μL). The mixture was ultrasonicated for 30 mins to generate a homogenous dispersion. Carbon paper was cut into 0.5 cm×2 cm stripes and dried at 30° C. for 12 hours in air prior to use. 10 μL of the as-prepared catalyst ink was drop-casted on the carbon paper and was allowed to dry in ambient atmosphere for 10 minutes before each measurement.

Electrochemical Results
Linear Sweep Voltammograms (LSVs).

Figure 5A:
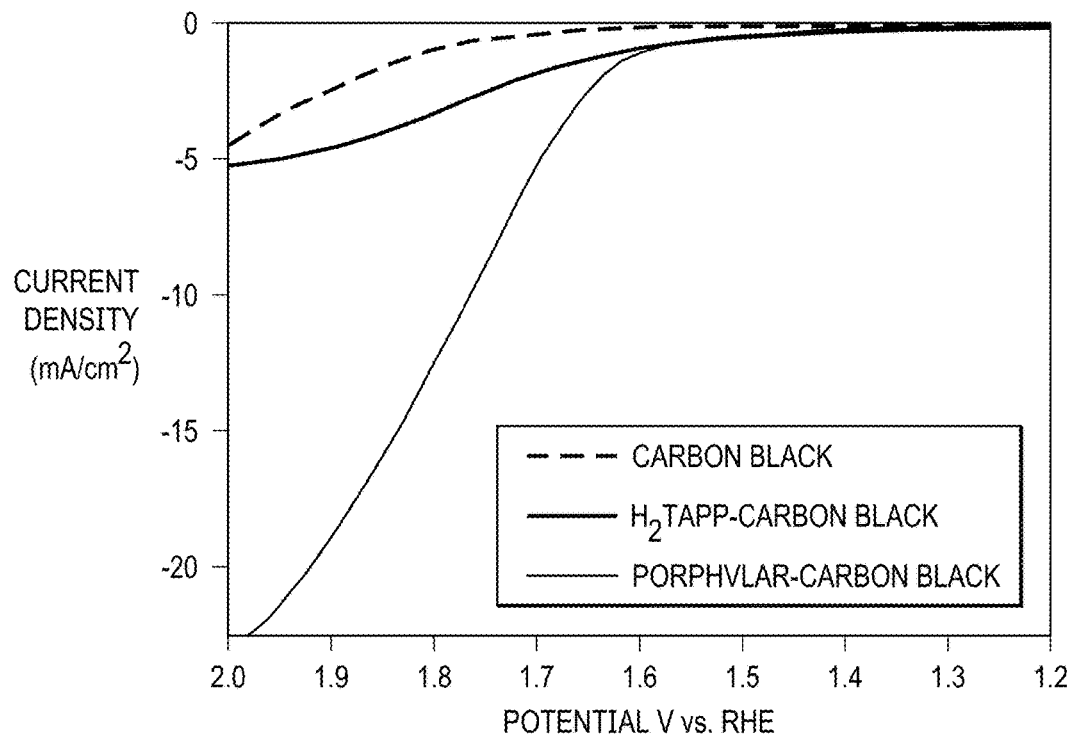
FIGS. 5A-5B are illustrations of polarization curves of molecular porphyrin ($H_2TAPP$) (blue), Porphvlar (red) and blank carbon black/carbon paper electrode under different conditions: (a) Oxidation in 1.0 M KOH aqueous solution, scan rate: 5 mV/s; and (b) Reduction in 1.0 M KCl aqueous solution, scan rate: 5 mV/s.
Figure 5B:
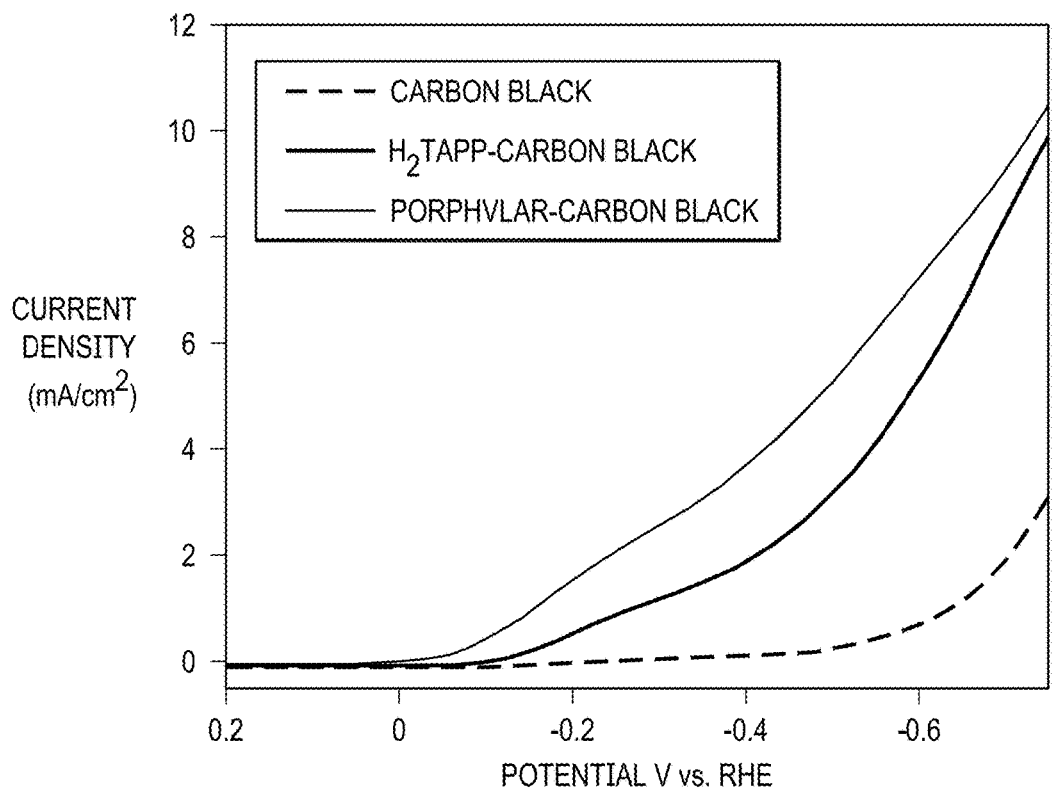

FIGS. 5A-5B illustrate polarization curves of molecular porphyrin ($H_2TAPP$) (blue), Porphvlar (red) and blank carbon black/carbon paper electrode under different conditions. The OER electrocatalytic activity evaluation of the resulting Porphvlar was performed in 1.0 M KOH aqueous solution with carbon paper as the conductive support electrode. The carbon black/carbon paper blank electrode has a negligible current increase (FIGS. 5A-5B black line).

Porphvlar exhibits a current increase in at 1.38 V vs. RHE (onset η=150 mV, approximately), although the current remains relatively low until 1.60 V (η=360 mV) where a sharp increase is observed. The molecular porphyrin parent material, $H_2TAPP$, has a similar onset potential where catalytic current is observed but with a low current response (FIG. 5A, blue line). These onset overpotentials are lower than those from reported metallated porphyrin composite materials (rGO/($Ni^{2+}$/THPP/$Co^{2+}$/THPP)$_n$: 1.49 V vs RHE) and other metal based OER catalysts (FeNi LDH/GO: 1.439 V vs RHE) in the heterogeneous system. The current response of Porphvlar reaches a current density of approximately 10 mA/cm$^2$ at 1.76 V (η=530 mV), while the molecular porphyrin plateaus at approximately 5 mA/cm$^2$. The generated gas obtained from bulk electrolysis during h was collected in a gas-tight H-type cell, and was confirmed to be $O_2$ by gas chromatography with 92.7% Faradaic efficiency.

FIG. 5B shows the HER electrocatalytic activity of Porphvlar in 1.0 M KCl aqueous solution. Porphvlar has a low onset potential of approximately 43 mV vs RHE. As observed during OER, Porphvlar has a higher current density response in HER compared to the free-base molecular unit. Porphvlar also has a better onset overpotentials than most of the reported HER electrocatalysts in neutral conditions (Table S1). In acidic conditions Porphvlar has poor HER activity (Figure S1). This is likely due to acid instability of the material.

Figure 11:
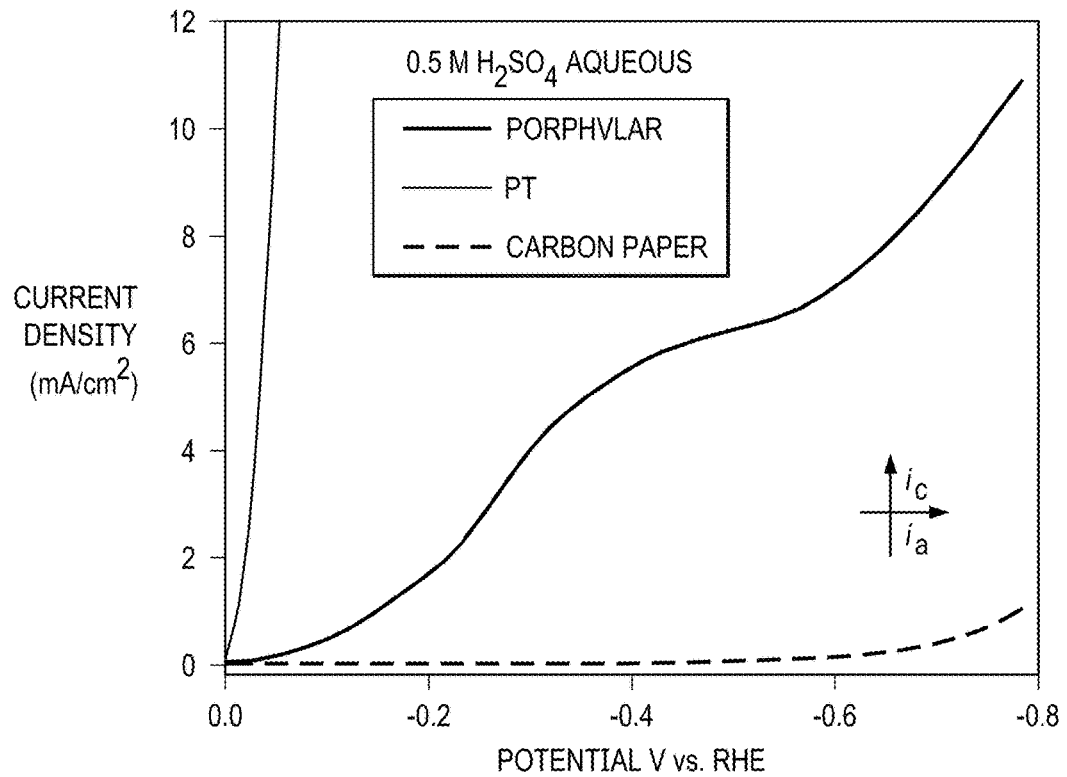
FIG. 11 is an illustration of polarization curves of molecular porphyrin ($H_2TAPP$)(blue), Porphvlar (red) and blank carbon black/carbon paper electrode under reduction in 0.5 M $H_2SO_4$ aqueous solution, scan rate: 5 mV/s.

FIG. 11 shows the HER electrocatalytic activity of Porphvlar in 0.5 M $H_2SO_4$ aqueous solution. The Pt working electrode exhibits a significant current increase at zero overpotential as benchmark for hydrogen evolution reaction. Porphvlar has a low onset potential of 36 mV vs. RHE and reaches current density of 1 mA/cm$^2$ at 177 mV. $H_2TAPP$ catalyst cannot perform HER in an acidic solution due to the protonation of molecular porphyrin occurred in acidic environment.

Figure 12:
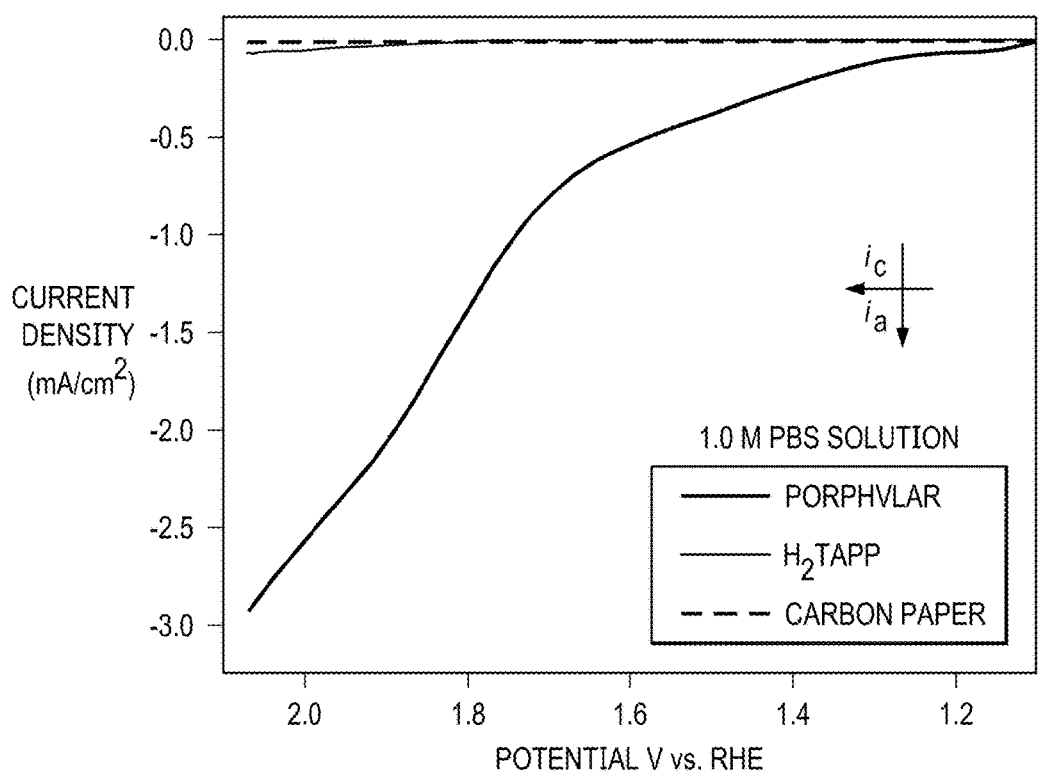
FIG. 12 is an illustration of polarization curves of molecular porphyrin ($H_2TAPP$)(blue), Porphvlar (red) and blank carbon black/carbon paper electrode under oxidation in 1.0 M PBS solution, scan rate: 5 mV/s.

FIG. 12 shows in neutral phosphate-buffer saline solution (PBS, pH 7.0) as supporting electrolyte, Porphvlar also exhibits OER catalytic activity. Upon oxidation, the current density of Porphvlar electrode increases at 1.31 V vs. RHE until 1.63 V vs. RHE, and with significant current increase. The Porphvlar electrode requires an overpotential of 520 mV to achieve a current density of 1 mA/cm$^2$, however, the molecular $H_2TAPP$ shows negligible current increase under oxidation conditions in PBS solution. The produced gas was collected with gas-tight H-cell with Faradaic efficiency of 52% for oxygen.

Figure 13:
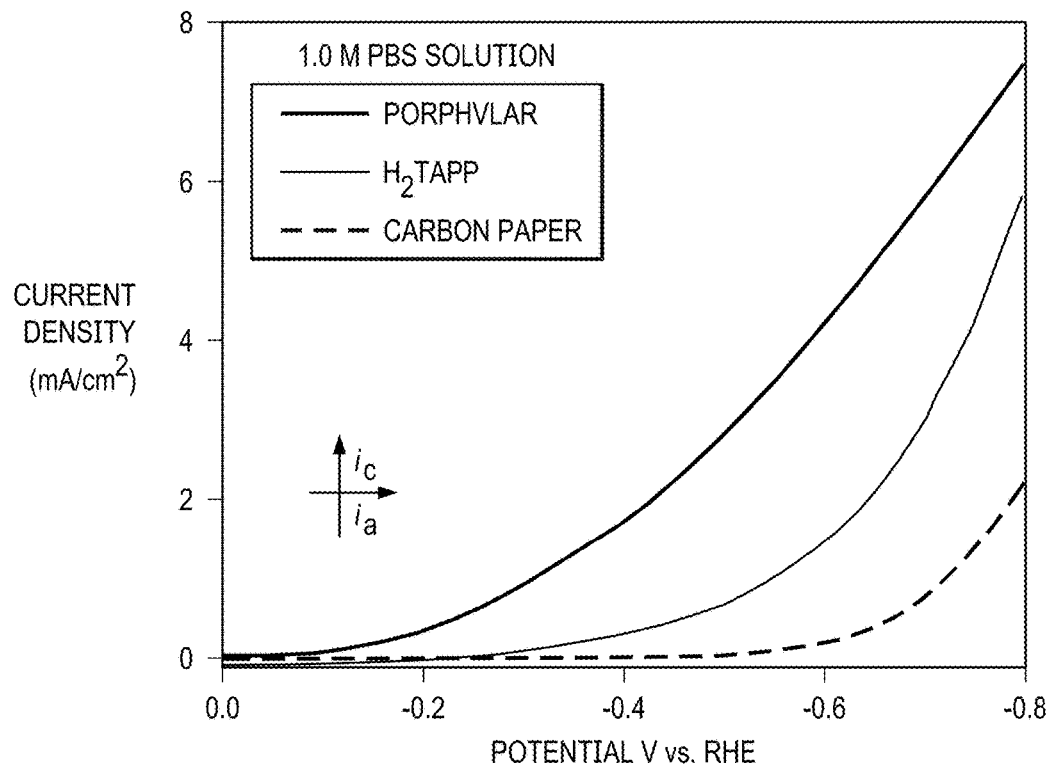
FIG. 13 is an illustration of polarization curves of molecular porphyrin ($H_2TAPP$)(blue), Porphvlar (red) and blank carbon black/carbon paper electrode under reduction in 1.0 M PBS solution, scan rate: 5 mV/s.
Figure 14:
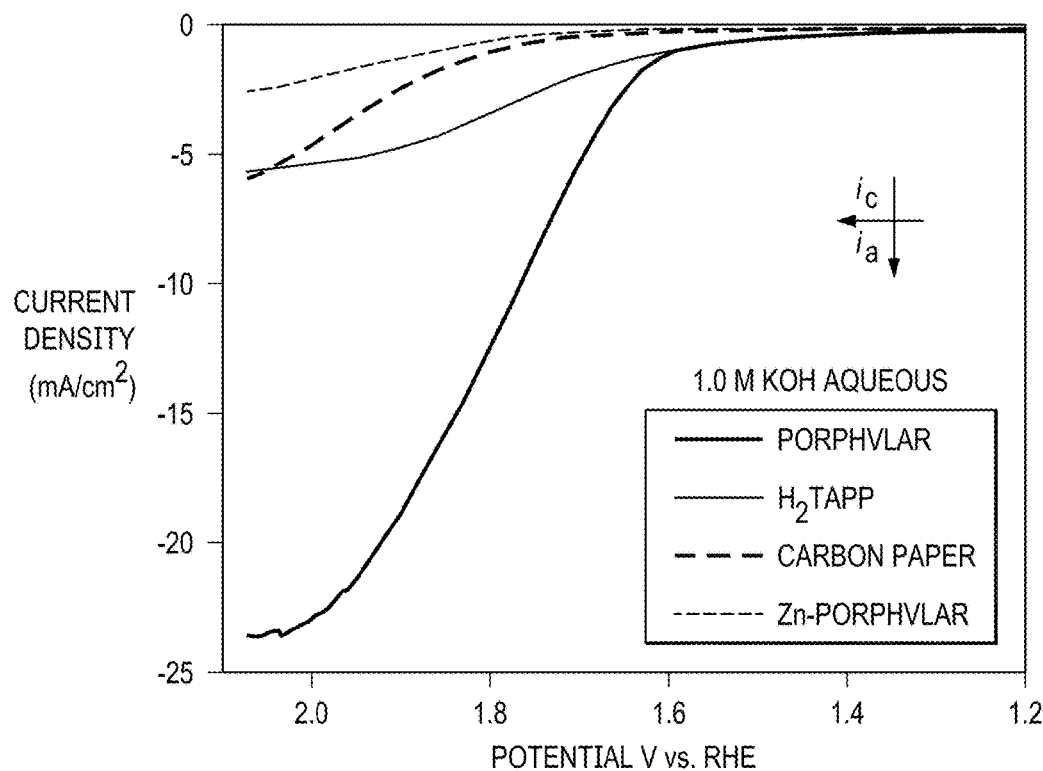
FIG. 14 is an illustration of polarization curves of molecular porphyrin ($H_2TAPP$)(blue), Porphvlar (red), Zn-Porphv
Figure 15:
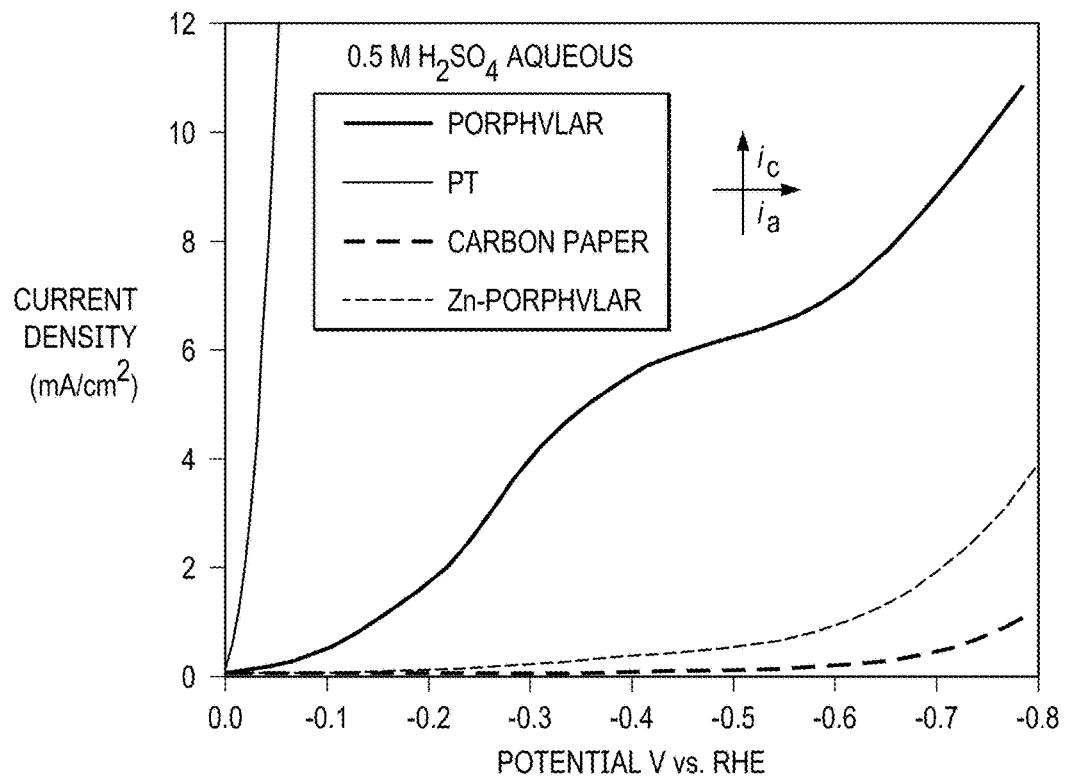
- FIG. 15 is an illustration of polarization curves of molecular porphyrin (H$_2$TAPP)(blue), Porphvlar (red), Zn-Porphvlar (magenta) and blank carbon black/carbon paper electrode under reduction in 0.5 M H$_2$SO$_4$ aqueous solution, scan rate: 5 mV/s.
Figure 16:
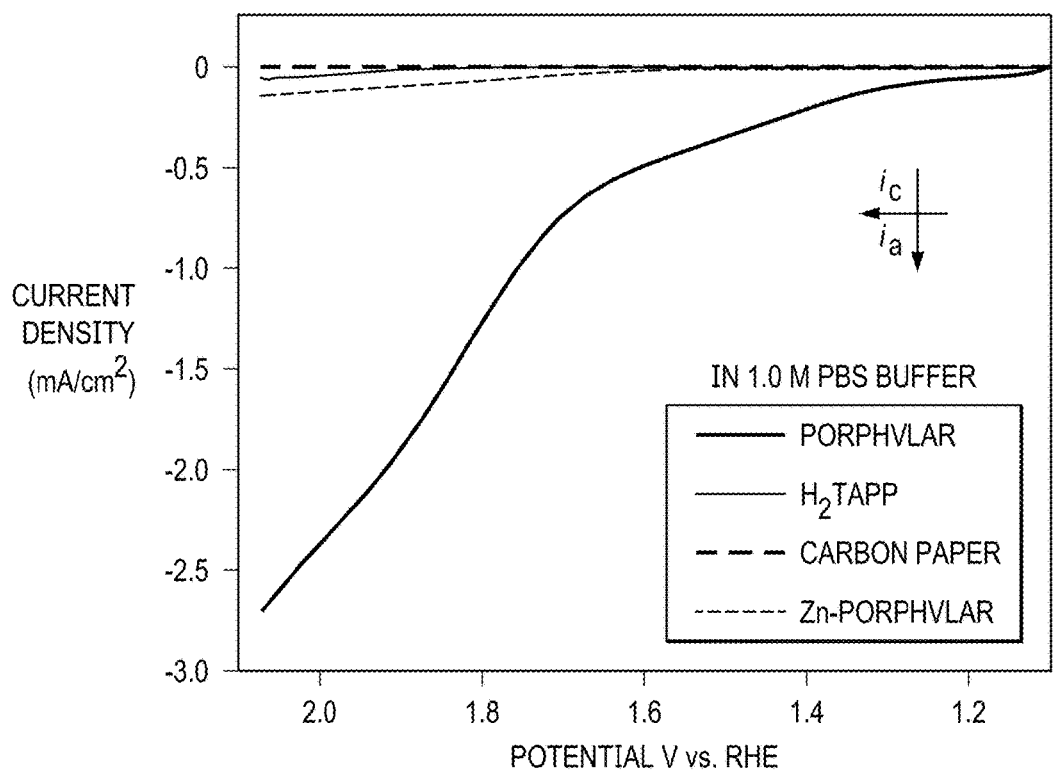
FIG. 16 is an illustration of polarization curves of molecular porphyrin (H$_2$TAPP)(blue), Porphvlar (red), Zn-Porphvlar (magenta) and blank carbon black/carbon paper electrode under oxidation in 1.0 M PBS solution, scan rate: 5 mV/s.
Figure 17:
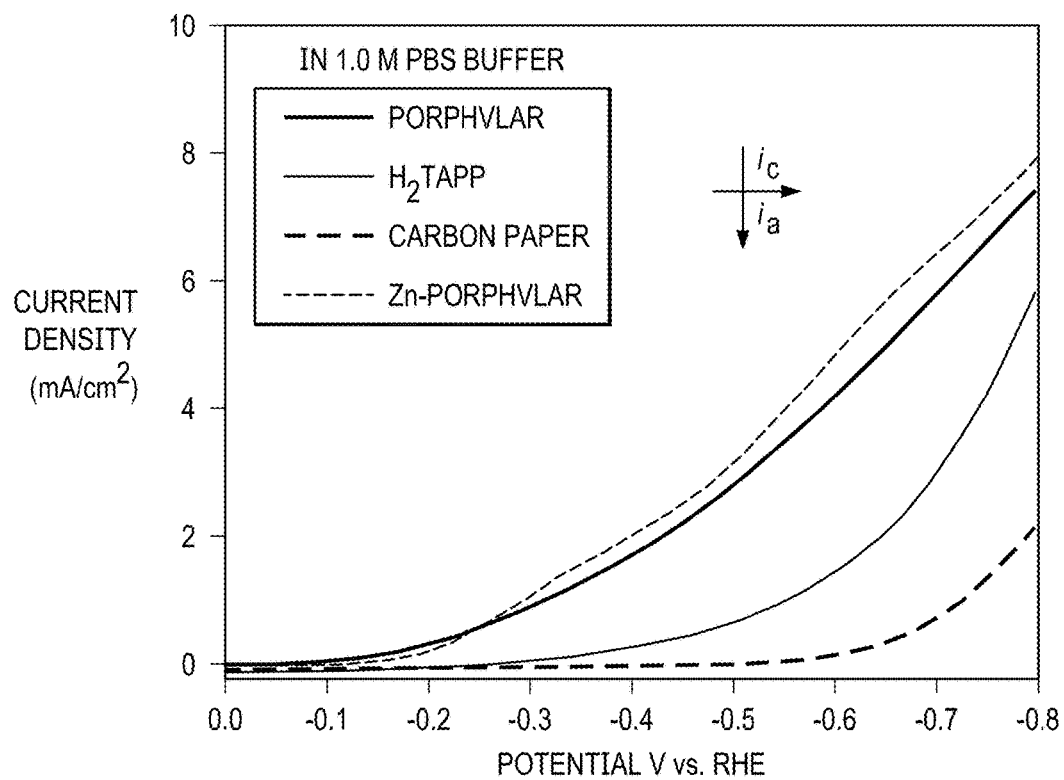
FIG. 17 is an illustration of polarization curves of molecular porphyrin (H$_2$TAPP)(blue), Porphvlar (red), Zn-Porphvlar (magenta) and blank carbon black/carbon paper electrode under reduction in 1.0 M PBS solution, scan rate: 5 mV/s.
Figure 18:
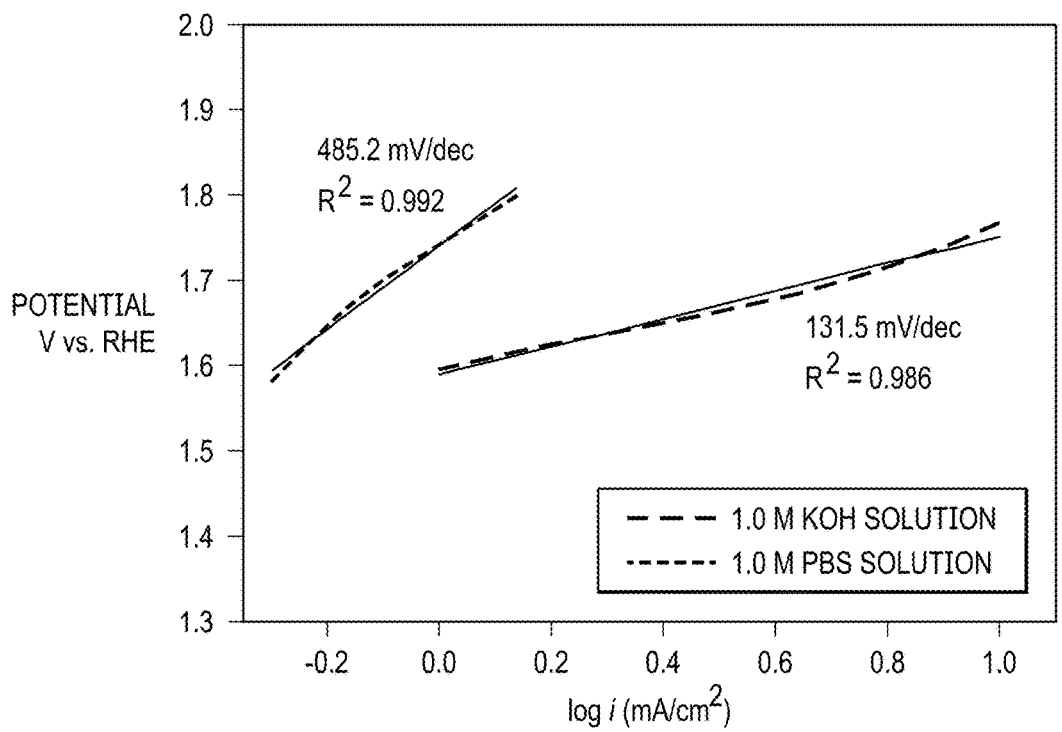
FIG. 18 is an illustration of Tafel plots of Porphvlar constructed by oxidation polarization curves in 1.0 M PBS solution in comparison with the Tafel slope in 1.0 M KOH aqueous solution.
Figure 19:
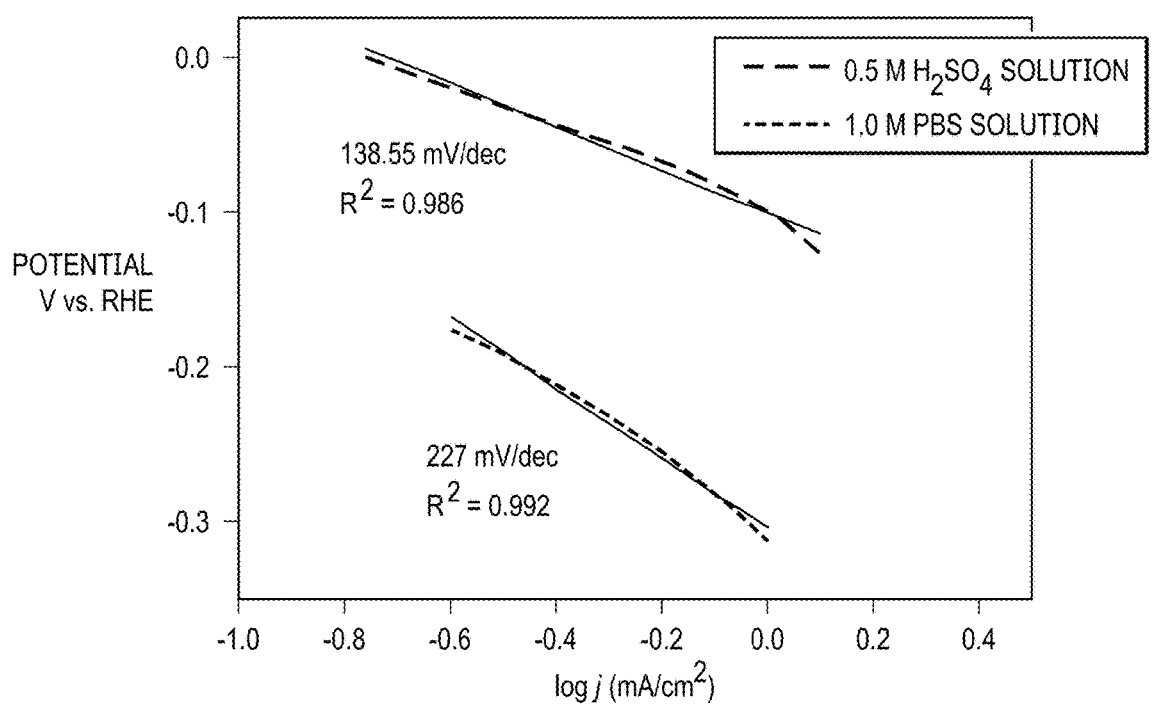
FIG. 19 is an illustration of Tafel plots of Porphvlar constructed by reduction polarization curves in 1.0 M PBS solution and 0.5 M H$_2$SO$_4$ aqueous solution.

FIG. 13 shows the water reduction reaction can also be catalyzed by Porphvlar in neutral PBS solution with onset overpotential of 77 mV vs. RHE ($η_j$=294 mV), which is comparable to most reported metal based HER catalysts in neutral media. The collected gas production was confirmed by gas chromatography as hydrogen gas with faraday efficiency of 99.55%.

For comparison, metallated sample of Porphvlar with a redox inactive Zn metal center incorporated in the porphyrin macrocyle was synthesized. Incorporation of a Zn center effectively shuts down the Porphvlar catalytic activity towards HER and OER. Zn-porphvlar shows considerable low current response towards the corresponding water splitting conditions.

Zn-porphvlar exhibits a similar overpotential and current density when performing reduction in 1.0 M PBS buffer. Thus, different mechanistic OER and HER pathways take place in PBS solutions.

Electrocatalytic Kinetic Measurements

Figure 6A:
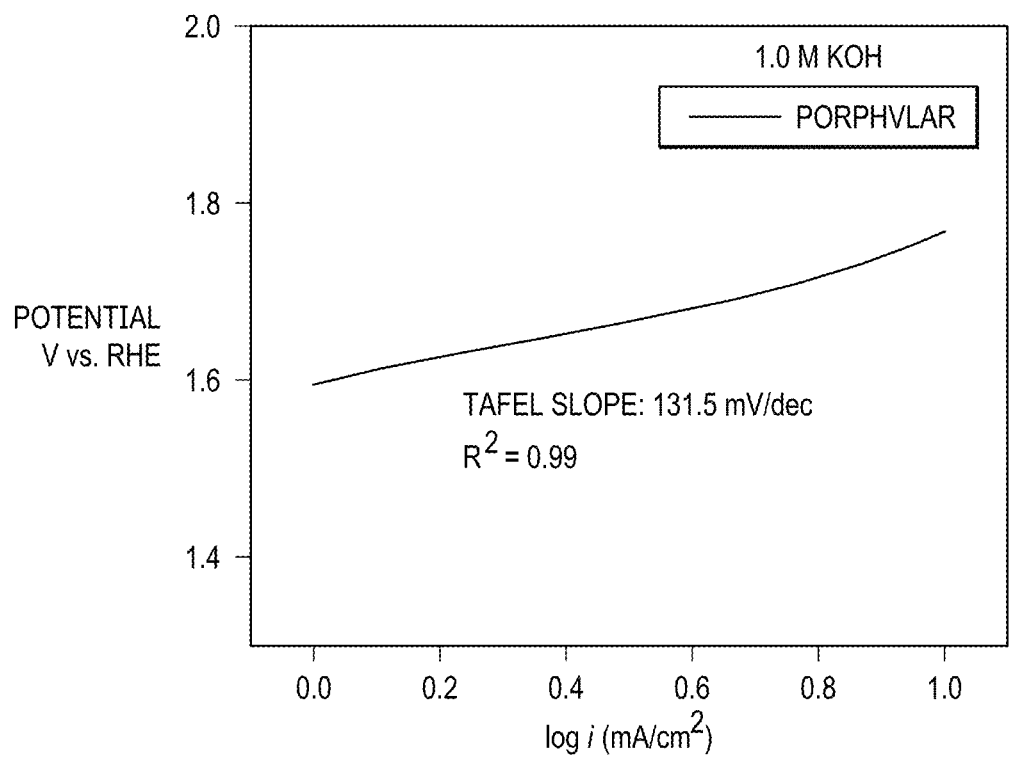
FIGS. 6A-6B are Tafel plots of Porphvlar constructed by polarization curves: (a) in 1.0 M KOH aqueous solution; and (b) in 1.0 M KCl aqueous solution.
Figure 6B:
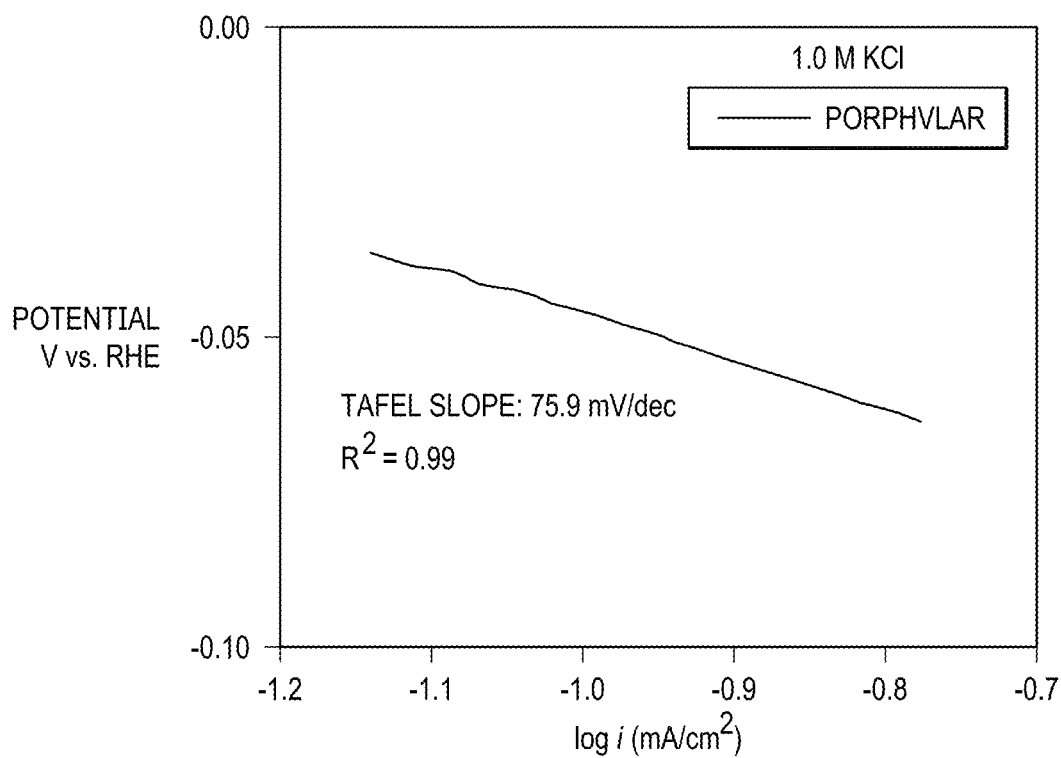

FIGS. 6A-6B show Tafel plots of Porphvlar constructed by polarization curves. In order to evaluate the kinetics during the electrolysis process, Tafel plots were constructed from polarization curves (FIGS. 6 (a) and (b)). The linear portions of the Tafel plots were fit to the Tafel equation:

$$η = b \log j + a$$

where η is the overpotential,
j is the current density, and
b is the Tafel slope.

The calculated Tafel slope for Porphvlar (131.5 mV/dec, approximately) in a 1.0 M KOH solution is comparable to that of the benchmark OER electrocatalyst $IrO_2$ (83 mV/dec), suggesting fast reaction kinetics and high OER activity. In a 1.0 M KCl solution, Porphvlar has an HER Tafel slope of approximately 75.9 mV/dec. The general HER mechanism in metal surfaces has been extensively studied, and it proposes three mechanisms during $H_2$ evolution with different Tafel slope: Volmer (120 mV/dec), Heyrovsky (40 mV/dec) and Tafel (30 mV/dec). The Porphvlar HER Tafel slopes (in neutral conditions) suggest a Volmer-Heyrovsky mechanism via water reduction:

$$(H_2O + e^- = H_{ads} + OH^- \text{ and } H_2O + e^- + H_{ads} = H_2 + OH^-).$$

When performing water reduction in 0.5 M $H_2SO_4$ solution, the estimated Tafel slope is 138.55 mV/dec, suggesting a Volmer-Heyrovsky mechanism. The Tafel slopes are larger for HER and OER in PBS solution compared to those in strong ionized electrolytes, likely due to the low ion and pH concentrations during water splitting.

Figure 7A:
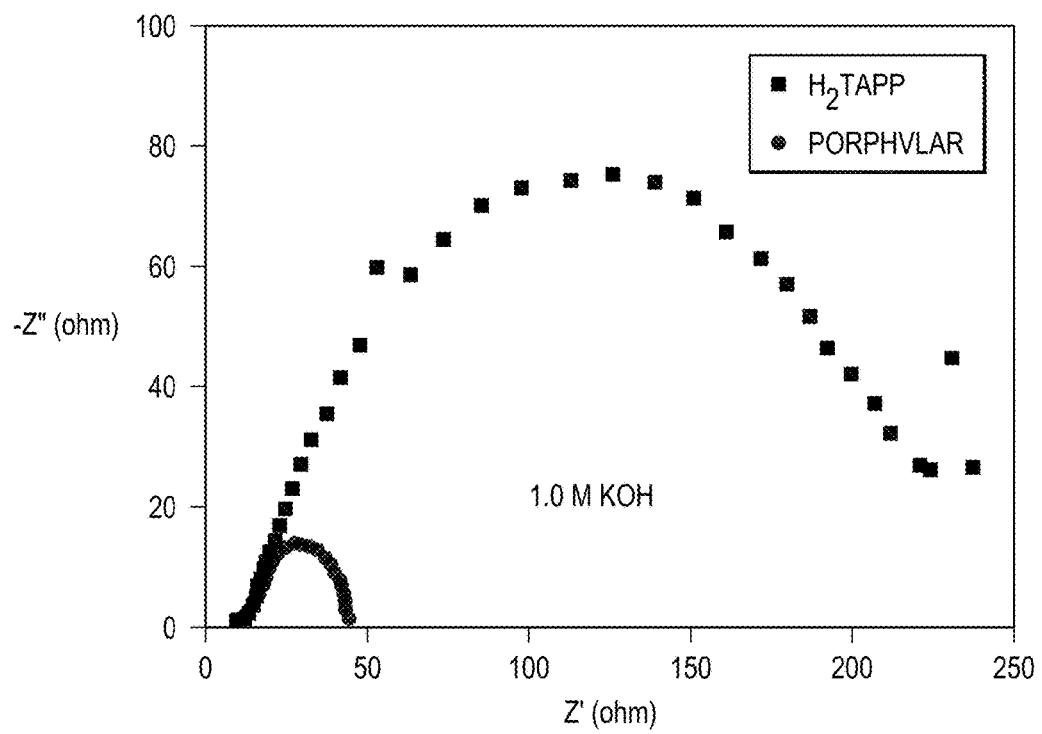
FIGS. 7A-7B are illustrations of electrochemical impedance spectroscopy of as-synthesized Porphvlar and $H_2TAPP$ under 250 mV overpotential: (a) in 1.0 M KOH aqueous solution; and (b) in 1.0 M KCl aqueous solution.
Figure 7B:
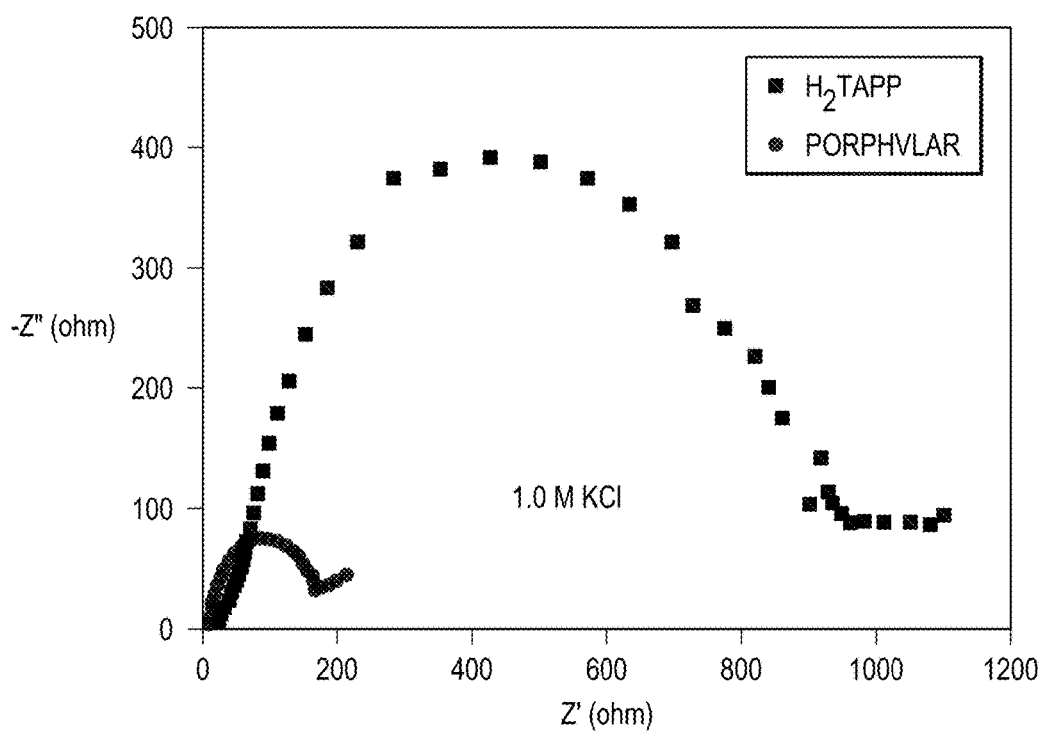

FIGS. 7A-7B show electrochemical impedance spectroscopy of as-synthesized Porphvlar and $H_2TAPP$ under 250 mV overpotential The properties of Porphvlar and $H_2TAPP$ under oxidation and reduction conditions were characterized by electrochemical impedance spectroscopy (EIS) in order to study the interface charge transport process.

The Nyquist plots of Porphvlar and $H_2TAPP$, obtained by measuring the parametric response of the imaginary part vs. real part of the impedance, are shown in FIGS. 7 (a) and (b). The diameter of the semicircle indicates the transfer of electrons from the electrode surface into the electrolyte solution since it arises from the parallel combination of Faradaic charge transfer resistance and non-Faradaic double-layer capacitance. Therefore, the smaller the semicircle the less the charge transfer resistance. It can be seen that the semicircle of Porphvlar has a diameter five times smaller than that of the molecular porphyrin unit. This suggests that the conjugation properties of the Porphvlar network (arising from the porphyrin moiety stacking) can largely increase electron transfer from the modified electrode to the electrolytes, enhancing the catalytic activity towards both HER and OER.

Figure 20:
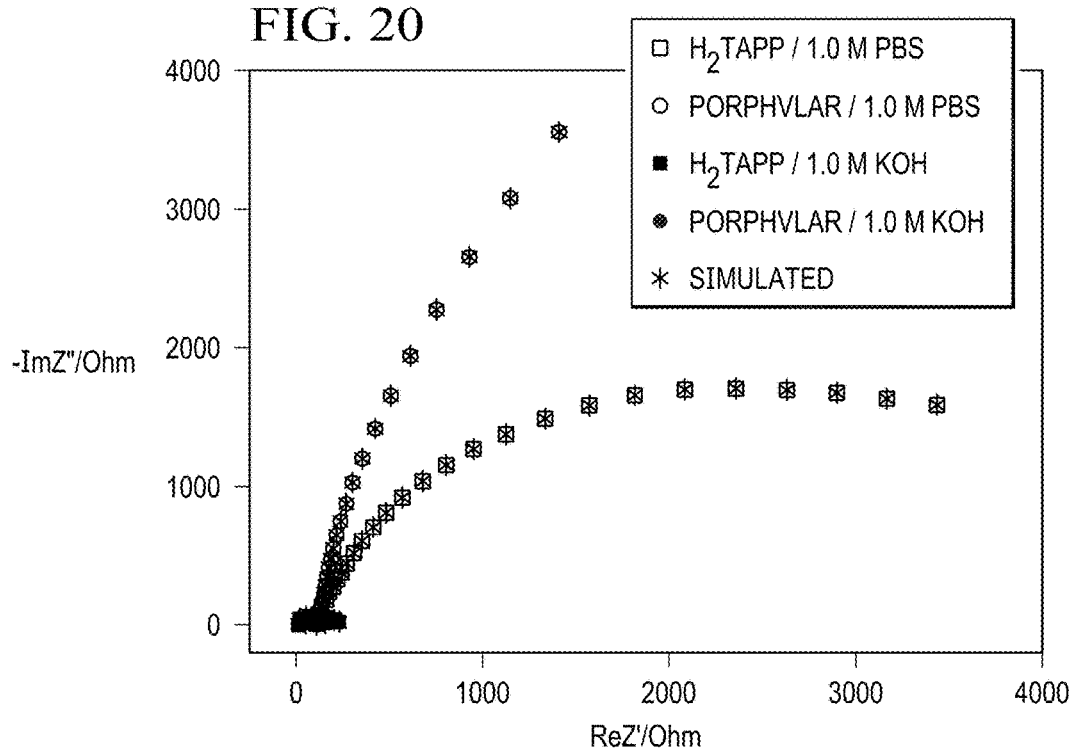
FIG. 20 is an illustration of electrochemical impedance spectroscopy of Porphvlar (red) and H$_2$TAPP (purple) operated at 250 mV overpotential under oxidation condition in 1.0 M PBS solution and the corresponding impedance simulation.
Figure 21:
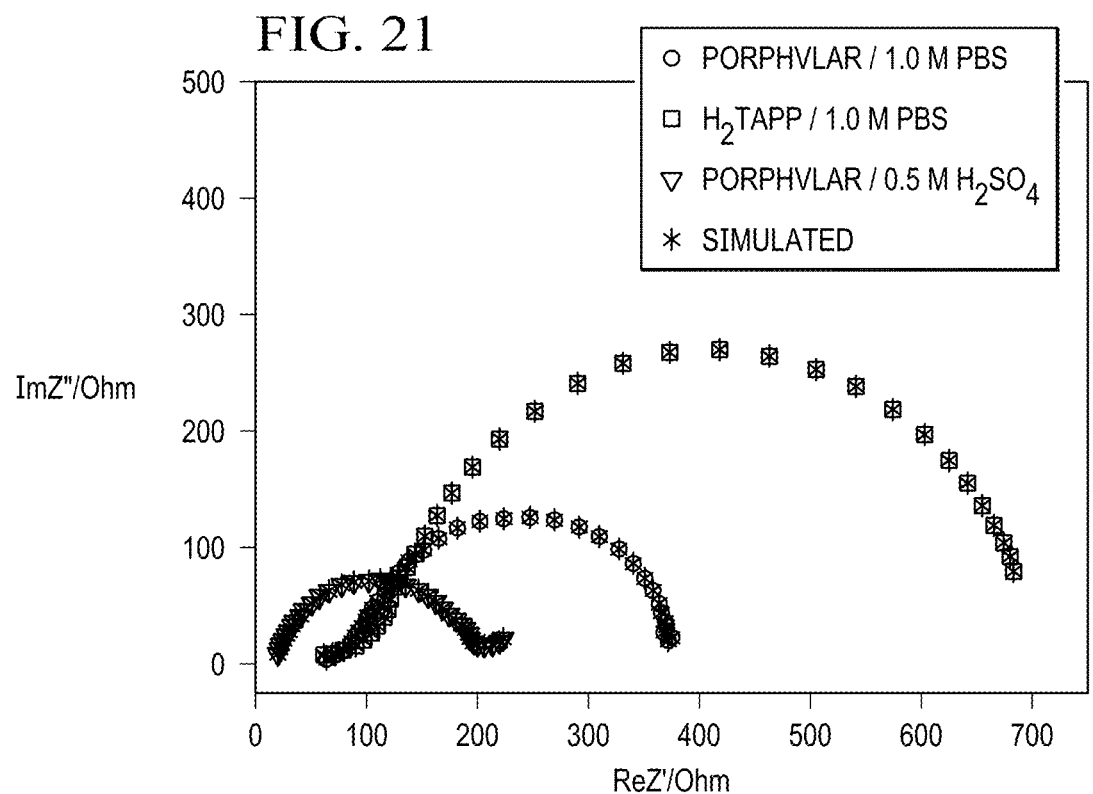
FIG. 21 is an illustration of electrochemical impedance spectroscopy of Porphvlar (red) and H$_2$TAPP (purple) operated at 250 mV overpotential under reduction condition in 0.5 M H$_2$SO$_4$ aqueous solution and 1.0 M PBS solution and the corresponding impedance simulation.

FIGS. 20 and 21 are illustrations of electrochemical impedances performed in 1.0 M PBS solution. The impedance is large when using PBS solutions. This is reasonable since in neutral solution, the $OH^-$ and $H^+$ concentration and ion activities are not good as the one in strong ionized solutions, as so the hindered charge transfer efficiency.

Figure 22:
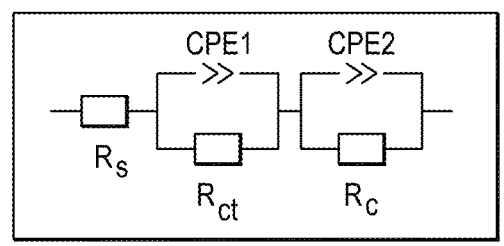
FIG. 22 is the equivalent Randles circuit model used for the impedance simulation.
Figure 23A:
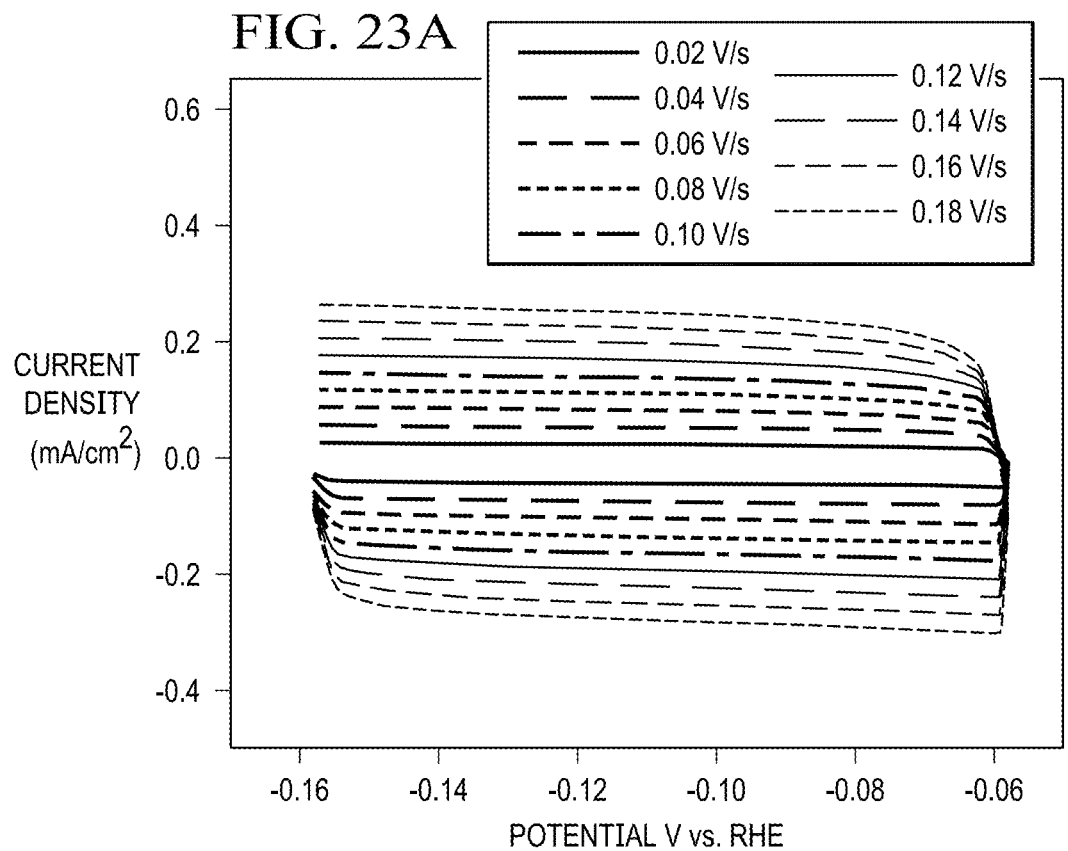
FIGS. 23A-23B are (a) an illustration of electrochemical active surface analysis by cyclic voltammetry in 1.0 M KOH aqueous solution at different scan rate and (b) the linear fitting of capacitive currents of porphvlar as a function of scan rates.
Figure 23B:
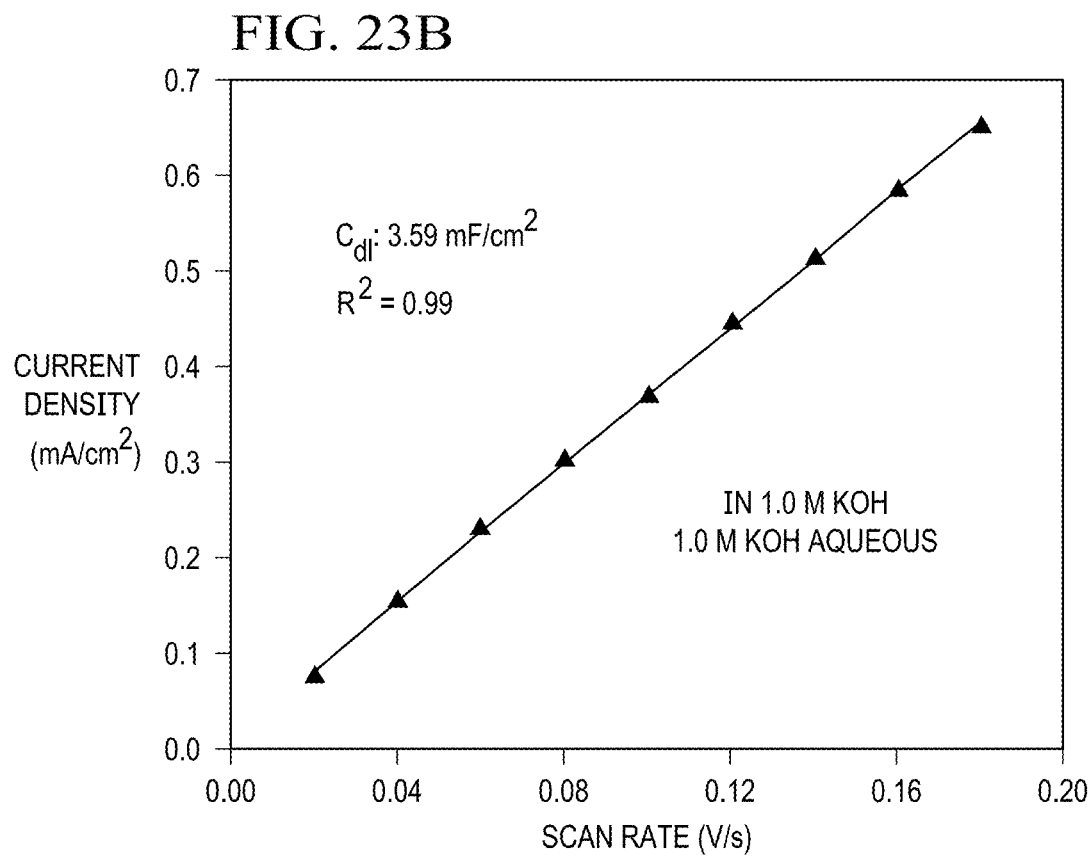
Figure 24A:
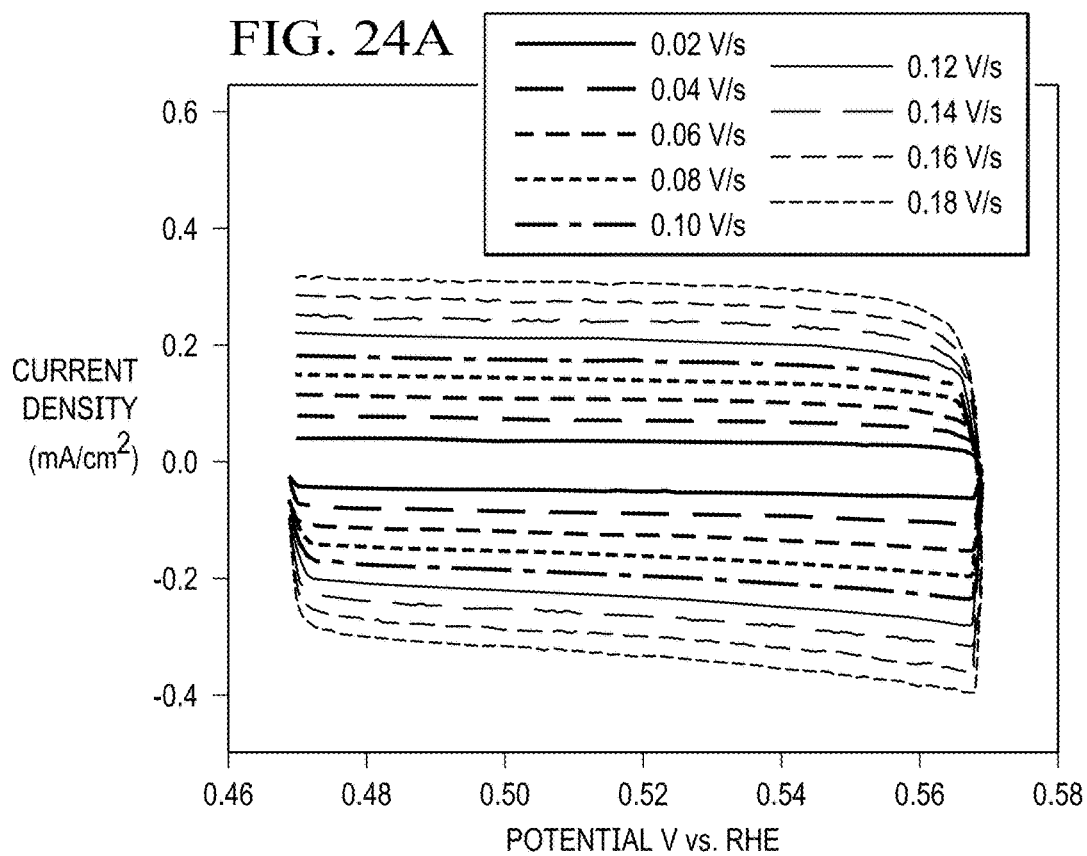
FIGS. 24A-24B are (a) an illustration of electrochemical active surface analysis by cyclic voltammetry in 0.5 M H$_2$SO$_4$ aqueous solution at different scan rate and (b) the linear fitting of capacitive currents of porphvlar as a function of scan rates.
Figure 24B:
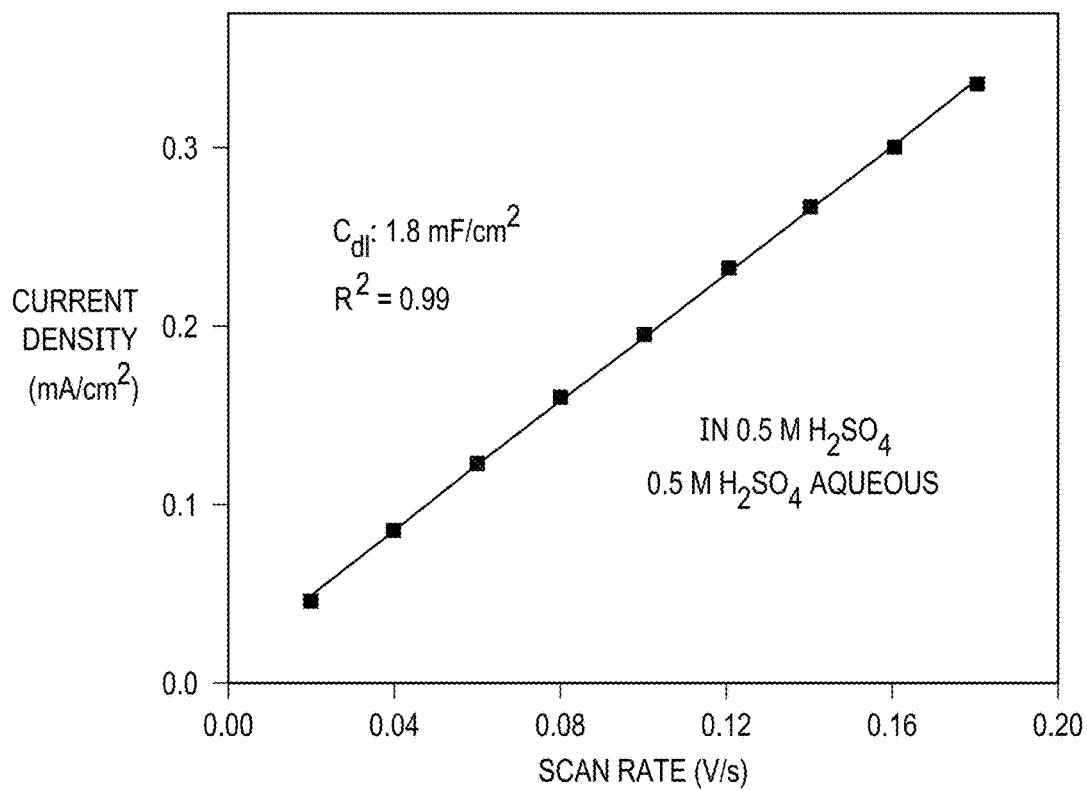
Figure 25A:
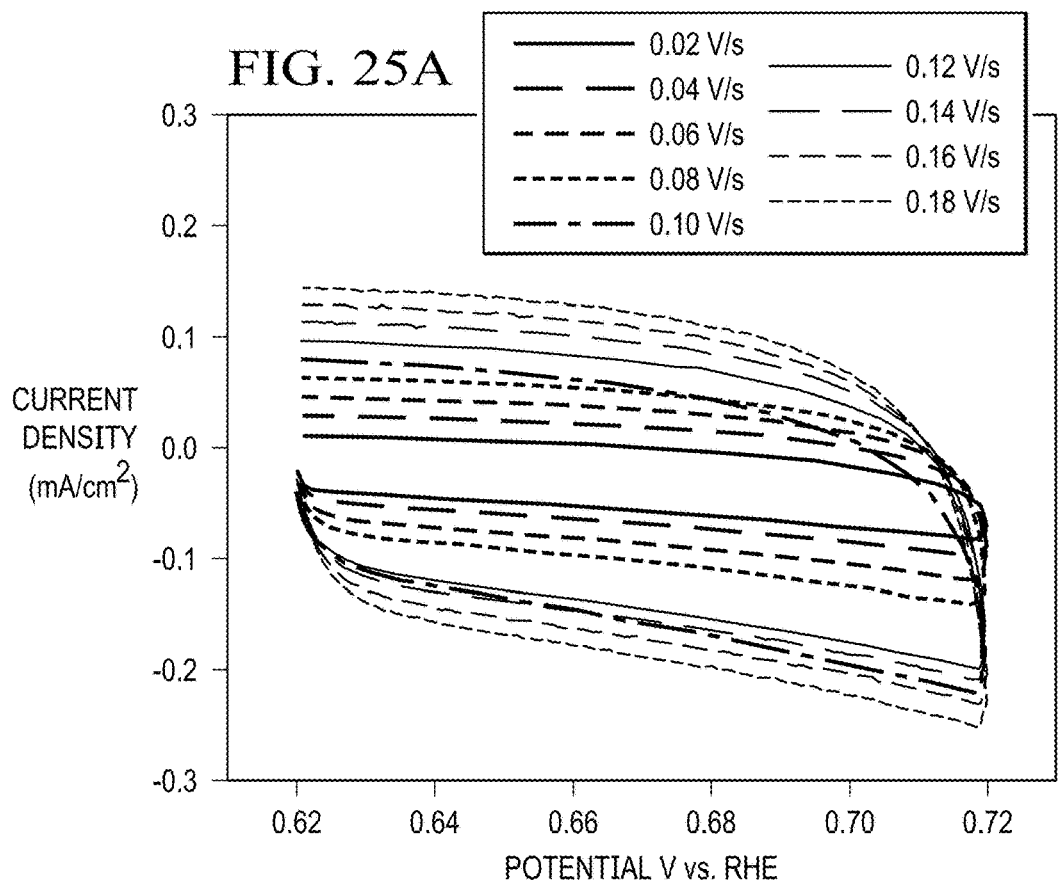
FIGS. 25A-25B are (a) an illustration of electrochemical active surface analysis by cyclic voltammetry in 1.0 M PBS solution at different scan rate and (b) the linear fitting of capacitive currents of porphvlar as a function of scan rates.
Figure 25B:
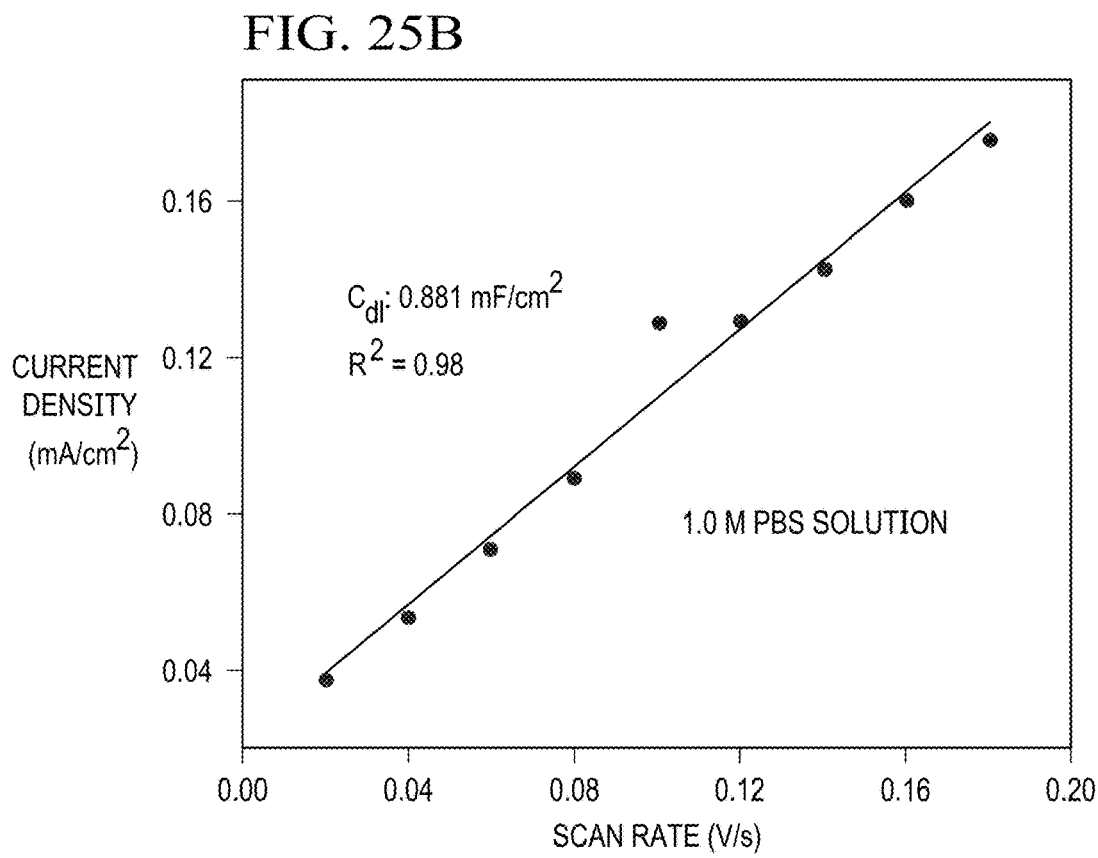

FIG. 22 shows all experimental electrochemical impedance data fit the simulation and equivalent Randles circuit. The water splitting reaction mechanism using Prophvlar fits into the classical Randles circuit.

FIGS. 23A-23B, 24A-24B and 25A-25B are illustrations of electrochemical active surface area (EASA) analysis in the electrolytes used in this report. The EASA was estimated through double-layer charging currents in the non-Faraday region using cyclic voltammetry. The rectangle shaped cyclic voltammograms indicate the capacitor behavior of Porphvlar. Linear fits of the charging current as a function of scan rate results in a plot in which the slope equals to the double layer capacitance ($C_{dl}$). The Porphvlar catalyst exhibits $C_{dl}$ of 3.59 mF/cm² in 1.0 M KOH, 1.8 mF/cm² in 0.5 M $H_2SO_4$ and 0.881 mF/cm² in 1.0 M PBS solution, respectively, which is comparable to some of the reported metal-based water splitting electrocatalysts.

Figure 8:
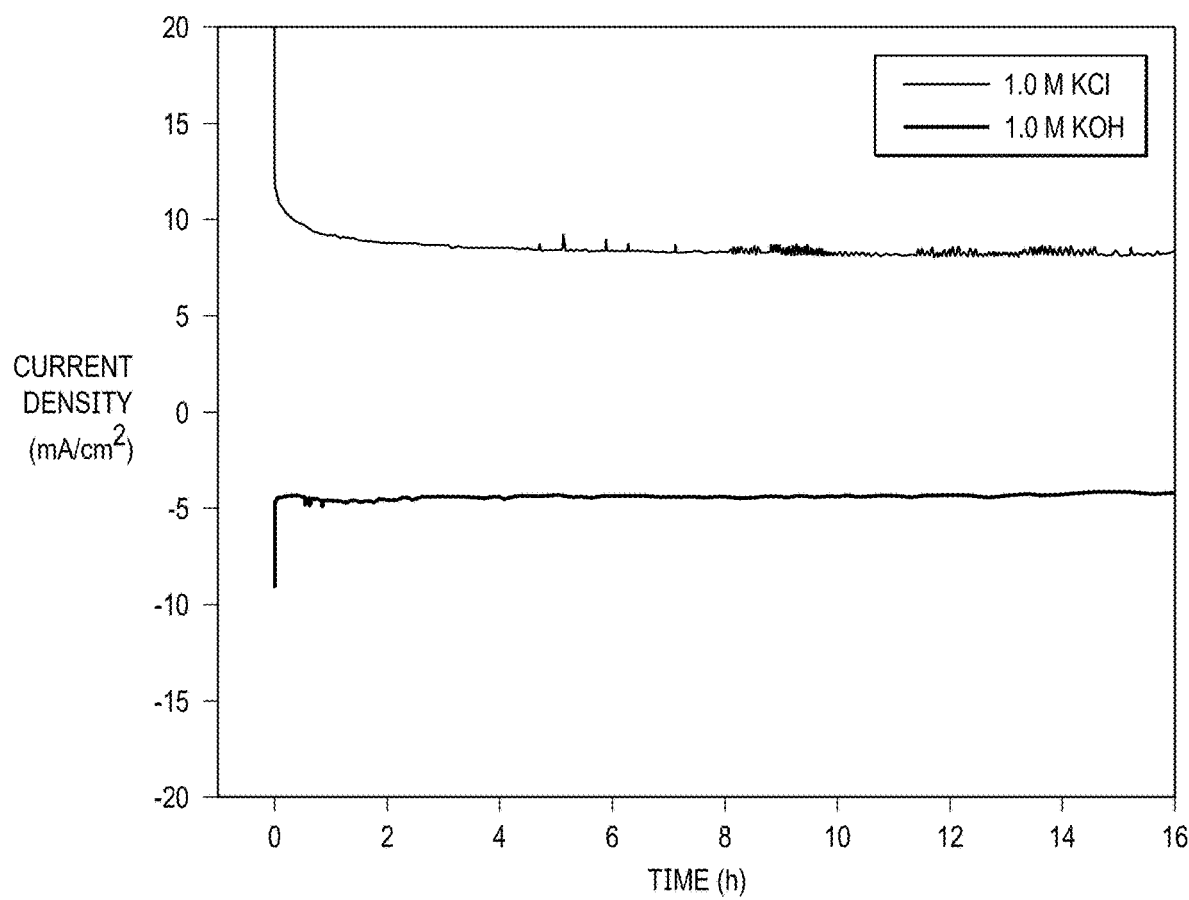
FIG. 8 is an illustration of time dependence of the current density for as-synthesized Porphvlar at static potential with current density at around 10 $mA/cm^2$ for HER in 1.0 M KCl solution (green) and at around 5 $mA/cm^2$ for OER in 1.0 M KOH (red).

FIG. 8 is an illustration of time dependence of the current density for as-synthesized Porphvlar at static potential. The long-term stability of Porphvlar under both oxidation and reduction conditions, was studied with bulk electrolysis for 16 hours. FIG. 8 shows that Porphvlar exhibits constant and stable anodic and cathodic currents during OER and HER electrocatalysis, respectively, during this timeframe. The durability of Porphvlar can be attributed to the stability of the conjugated porphyrin networks and the hydrogen bonding within its layers that result in a unique catalytic material for HER and OER.

Figure 9:
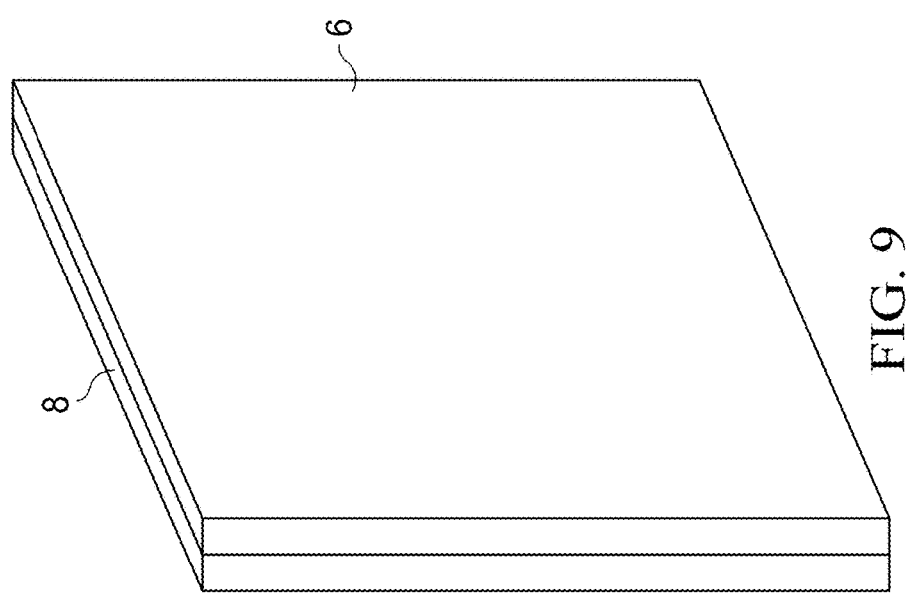
FIG. 9 is a perspective view of an electrode that includes the bifunctional metal-free Porphvlar polymer catalyst.

FIG. 9 is a perspective view of an electrode that includes the bifunctional metal-free Porphvlar polymer catalyst. The electrode includes a catalytic layer 6 on an electrode base 8. The catalytic layer 6 includes, consists of, or consists essentially of one or more of the catalysts. The catalytic layer 6 can include components in addition to the one or more catalysts. For instance, the catalytic layer 6 can include one or more components selected from the group consisting of binders, polymers, membranes, electrical conductors, ionic conductors, solid electrolytes, porous materials, and inert support materials. The electrode base 8 represents the portion of the electrode having a traditional electrode construction. Alternately, the electrode base 8 represents the portion of the electrode having a traditional electrode construction but with a prior catalytic layer removed from the electrode. Accordingly, the catalytic layer 6 can be added to a prior art electrode or can replace a catalytic layer 6 on a prior art electrode.

The electrode base 8 can be a current collector such as a metal foil or sheet, mesh, or conducting fabric. As will become evident from the below illustration of a solar fuels generator, the electrode base 8 can be or include a semiconductor layer. Although the electrode base 8 is shown as a single layer of material, the electrode base 8 can include multiple layers of material. For instance, the electrode base 8 can include one or more layers of active material on a current collector. In instance where the electrode is employed to oxidize water, the electrode operates as an anode. During fabrication of the electrode, in some instances, the electrode base serves as the support for the catalyst. Accordingly, the catalyst can be formed directly on the electrode base.

Although the catalytic layer 6 is illustrated as being located on one side of the electrode base 8, the catalytic layer 6 can be located on both sides of the electrode base. Additionally or alternately, FIG. 9 illustrates the catalytic layer 6 being located on the electrode base 8; however, the electrode base 8 can be embedded in the catalytic layer 6. For instance, electrode base 8 can be a mesh that is embedded in the catalytic layer 6. Although FIG. 9 illustrates the catalytic layer 6 as a continuous layer of material, the catalytic layer 6 can be patterned so there are openings through the catalytic layer 6 and/or so there are regions of the catalytic layer 6 that are not continuous with one another such as would occurs when the catalytic layer 6 is arranged in islands on the electrode base.

In the illustration of FIG. 9, the face of the catalytic layer is illustrated as being substantially planar. However, the surface area of the catalyst layer can be increased beyond what can be achieved with the planar face. The high Tafel slopes associated with these catalysts indicate that increasing the surface area of the catalyst can increase the catalytic current for a given overpotential. A variety of methods can be employed to increase the surface area of the catalyst. For instance, the catalytic layer can be porous and/or can be microstructured using techniques such as mesoscale self assembly, soft lithograph, lithography, anodic etching, or other methods known to the art. In some instances, the catalytic layer is constructed such that the specific surface area of the catalytic layer is much greater than the geometric area of the electrode. This can be expressed as a surface roughness factor (specific surface area/geometric area of the surface area of a planar electrode covered by the catalytic layer). A non-porous catalyst layer with a smooth surface would have a surface roughness factor of 1. The catalytic layer may have surface roughness factors greater than 1, 10, 100 or 1000.

The electrode can be employed in an oxygen evolution system where the Oxygen Evolution Reaction is catalyzed at one or more electrodes included in the system. Examples of these systems include, but are not limited to, water electrolysis systems, solar fuels generators, electrowinning systems, electrolytic hydrogen generators, reversible fuel cells, and reversible air batteries.

Figure 10:
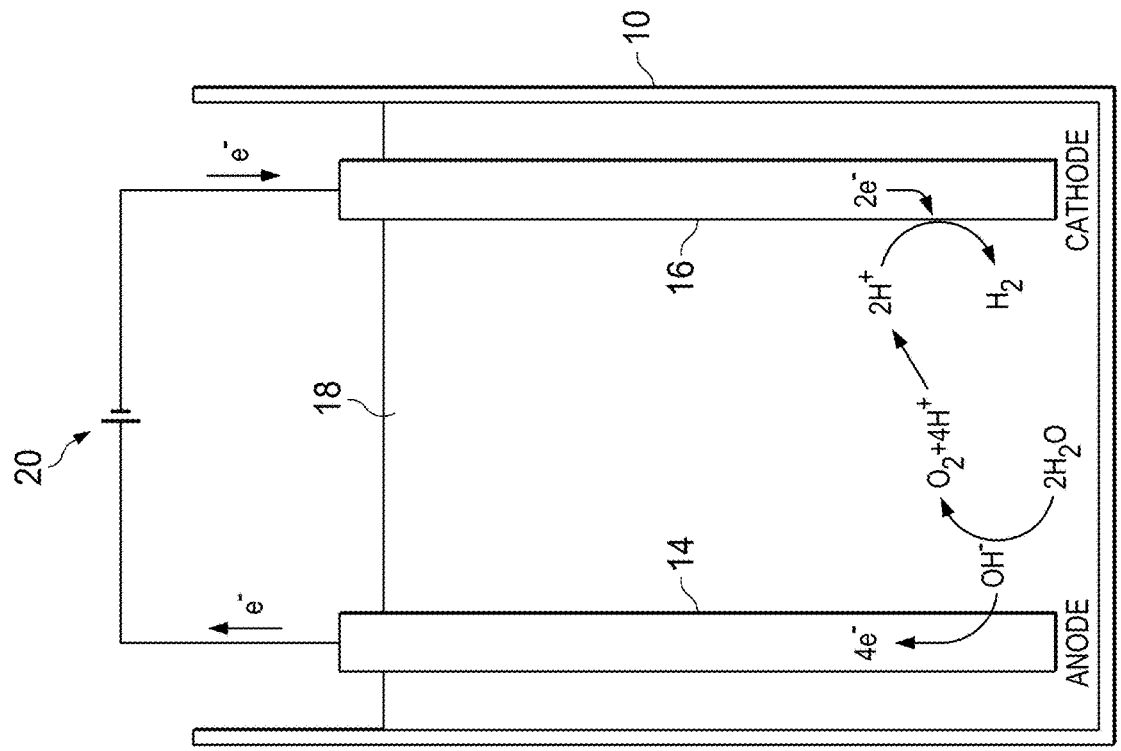
FIG. 10 is an example of a water electrolysis system that includes the bifunctional metal-free Porphvlar polymer catalyst.

FIG. 10 provides an example of a water electrolysis system. The system includes a vessel 10 having a reservoir. Anodes 14 and cathodes 16 are positioned in the reservoir such that anodes 14 and cathodes 16 alternate with one another. The anodes 14 and cathodes 16 are parallel or substantially parallel with one another. A medium 18 is positioned in the reservoir such that anodes 14 and the cathodes 16 are in contact with the medium 18. The anode can be constructed according to FIG. 9. For instance, the catalytic layer 6 can include or consist of a catalyst such as bifunctional metal-free Porphvlar polymer and the electrode base 8 can be a fluorine doped tin oxide film on glass, a suitable light absorbing semiconductor, or a titanium foil current collector. The anode can include a layer of semiconductor or metal oxide on an FTO/glass or suitable foil current collector. The cathode and anode are connected to a voltage source 20 that is sufficient to apply the overpotential needed to cause the water electrolysis illustrated in FIG. 10. The voltage source can be any voltage source such as a photovoltaic voltage source, battery or other electronics. The term coupled is intended to mean connected, although not necessarily directly, and not necessarily mechanically. The term substantially is intended to mean largely but not necessarily wholly that which is specified (e.g. at least 95%). The term approximately is intended to mean at least close to a given value (e.g., within 5% of). Unless expressly stated to the contrary in the intrinsic text of this document, the term or is intended to mean an inclusive or and not an exclusive or. Specifically, a condition A or B is satisfied by any one of the following: A is true (or present) and B is false (or not present), A is false (or not present) and B is true (or present), and both A and B are true (or present). The terms a and/or an are employed for grammatical style and merely for convenience.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The appended claims are not to be interpreted as including means-plus-function limitations, unless such a limitation is explicitly recited in a given claim using the phrase(s) "means for" or "mechanism for" or "step for". Sub-generic embodiments of this disclosure are delineated by the appended independent claims and their equivalents. Specific embodiments of this disclosure are differentiated by the appended dependent claims and their equivalents.

What is claimed is:

1. A bifunctional electrocatalyst, comprising:
a metal-free porphyrin-based organic polymer,
wherein the metal-free porphyrin-based organic polymer further comprises a two-dimensional polymer network, comprising poly(p-phenylene terephthalamide)(PPTA).

2. The bifunctional electrocatalyst of claim 1, wherein bifunctional electrocatalyst catalyzes a hydrogen evolution reaction (HER) in neutral or acidic reaction solutions.

3. The bifunctional electrocatalyst of claim 2, wherein bifunctional electrocatalyst provides an onset overpotential, η, of approximately 43 mV for HER in a 1.0 M KCl aqueous solution.

4. The bifunctional electrocatalyst of claim 2, wherein bifunctional electrocatalyst provides HER Tafel slope of approximately 75.9 mV/dec for HER in a 1.0 M KCl aqueous solution.

5. The bifunctional electrocatalyst of claim 2, wherein a current response of the bifunctional electrocatalyst reaches a current density of approximately 10 mA/cm$^2$ at 1.76 V (η=530 mV) for HER in a 1.0 M KCl aqueous solution.

6. The bifunctional electrocatalyst of claim 5, wherein the current density is substantially constant over a period greater than 16 hours.

7. The bifunctional electrocatalyst of claim 1, wherein the bifunctional electrocatalyst catalyzes an oxygen evolution reaction (OER) in basic reaction solutions.

8. The bifunctional electrocatalyst of claim 7, wherein the bifunctional electrocatalyst provides an onset overpotential, η, of approximately 150 mV for OER in a in 1.0 M KOH aqueous solution.

9. The bifunctional electrocatalyst of claim 7, wherein the bifunctional electrocatalyst provides HER Tafel slope of approximately 131.5 mV/dec for OER in a 1.0 M KOH aqueous solution.

10. The bifunctional electrocatalyst of claim 7, wherein a current response of bifunctional electrocatalyst reaches a current density of approximately 5 mA/cm$^2$ at 1.76 V (η=530 mV) for OER in a 1.0 M KOH aqueous solution.

11. The bifunctional electrocatalyst of claim 10, wherein the current density is substantially constant over a period of greater than 16 hours.

12. An electrolytic cell, comprising:
an electrode comprising:
a base; and
a catalytic layer located on the base, the catalytic layer including a metal-free porphyrin-based organic polymer; and
a counter electrode coupled to the electrode,
wherein the metal-free porphyrin-based organic polymer further comprises a two-dimensional polymer network, comprising poly(p-phenylene terephthalamide) (PPTA).

13. The electrolytic cell of claim 12, wherein the two-dimensional polymer network is synthesized through condensation polymerization of 5,10,15,20-Tetrakis(4-aminophenyl) porphyrin (H$_2$TAPP) and terephthaloyl chloride.

14. The electrolytic cell of claim 12, wherein the metal-free porphyrin-based organic polymer includes a bifunctional electrocatalyst that catalyzes a hydrogen evolution reaction (HER) in neutral or acidic reaction solutions, and catalyzes an oxygen evolution reaction (OER) in basic reaction solutions.

15. A bifunctional electrocatalyst, comprising:
a metal-free porphyrin-based organic polymer,
wherein the metal-free porphyrin-based organic polymer further comprises a two-dimensional polymer network, comprising poly(p-phenylene terephthalamide)(PPTA),
wherein bifunctional electrocatalyst catalyzes a hydrogen evolution reaction (HER) in neutral or acidic reaction solutions, and
wherein the bifunctional electrocatalyst catalyzes an oxygen evolution reaction (OER) in basic reaction solutions.

16. The bifunctional electrocatalyst of claim 15, wherein bifunctional electrocatalyst provides an onset overpotential, η, of approximately 43 mV for HER in a 1.0 M KCl aqueous solution.

17. The bifunctional electrocatalyst of claim 15, wherein bifunctional electrocatalyst provides HER Tafel slope of approximately 75.9 mV/dec for HER in a 1.0 M KCl aqueous solution.

18. The bifunctional electrocatalyst of claim 15, wherein a current response of the bifunctional electrocatalyst reaches a current density of approximately 10 mA/cm$^2$ at 1.76 V (η=530 mV) for HER in a 1.0 M KCl aqueous solution.

19. The bifunctional electrocatalyst of claim 15, wherein the bifunctional electrocatalyst provides an onset overpotential, η, of approximately 150 mV for OER in a in 1.0 M KOH aqueous solution.

20. The bifunctional electrocatalyst of claim 15, wherein the bifunctional electrocatalyst provides HER Tafel slope of approximately 131.5 mV/dec for OER in a 1.0 M KOH aqueous solution.

21. The bifunctional electrocatalyst of claim 15, wherein a current response of bifunctional electrocatalyst reaches a current density of approximately 5 mA/cm$^2$ at 1.76 V (η=530 mV) for OER in a 1.0 M KOH aqueous solution.

* * * * *